United States Patent
Li et al.

(10) Patent No.: US 11,232,371 B2
(45) Date of Patent: Jan. 25, 2022

(54) COMPUTER SYSTEM AND METHOD FOR DETECTING ANOMALIES IN MULTIVARIATE DATA

(71) Applicant: Uptake Technologies, Inc., Chicago, IL (US)

(72) Inventors: Tuo Li, Chicago, IL (US); James Herzog, Downers Grove, IL (US)

(73) Assignee: Uptake Technologies, Inc., Chicago, IL (US)

( * ) Notice: Subject to any disclaimer, the term of this patent is extended or adjusted under 35 U.S.C. 154(b) by 1061 days.

(21) Appl. No.: 15/788,622

(22) Filed: Oct. 19, 2017

(65) Prior Publication Data
US 2019/0122138 A1 Apr. 25, 2019

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC .................................. G06N 20/00; G06N 5/04
See application file for complete search history.

(56) References Cited

U.S. PATENT DOCUMENTS

| | | |
|---|---|---|
| 5,566,092 A | 10/1996 | Wang et al. |
| 5,633,800 A | 5/1997 | Bankert et al. |
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |

(Continued)

FOREIGN PATENT DOCUMENTS

| | | |
|---|---|---|
| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014).

(Continued)

*Primary Examiner* — Kamran Afshar
*Assistant Examiner* — Ryan C Vaughn
(74) *Attorney, Agent, or Firm* — Lee Sullivan Shea & Smith LLP

(57) ABSTRACT

A data analytics platform may be configured to construct an inferential model for a multivariate observation vector using inferential modeling in combination with component analysis, which may enable the data analytics platform to evaluate only a subset of the variables in the observation vector and then output a predicted version of the multivariate observation vector that includes predicted values for the full set of variables that was originally included in the observation vector. In turn, the data analytics platform may use the predicted version of the multivariate observation vector output by the inferential model to determine whether an anomaly has occurred.

18 Claims, 9 Drawing Sheets
(3 of 9 Drawing Sheet(s) Filed in Color)

(56) References Cited

U.S. PATENT DOCUMENTS

| | | |
|---|---|---|
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0088550 A1 | 4/2007 | Filev et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0201278 A1 | 8/2008 | Muller et al. |
| 2012/0166142 A1 | 6/2012 | Maeda et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0170055 A1* | 6/2015 | Beymer ............... G06N 20/00 706/12 |
| 2015/0262060 A1 | 9/2015 | Husain et al. |
| 2016/0042287 A1 | 2/2016 | Eldardiry et al. |
| 2016/0226737 A1 | 8/2016 | Boubez |
| 2017/0083818 A1* | 3/2017 | Goto .................. G06N 20/00 |
| 2017/0091637 A1* | 3/2017 | Chae .................. G06N 20/10 |
| 2017/0372232 A1* | 12/2017 | Maughan ............ G06N 20/00 |
| 2019/0102693 A1* | 4/2019 | Yates ................. G06N 20/20 |
| 2020/0167691 A1* | 5/2020 | Golovin .............. G06N 7/005 |

FOREIGN PATENT DOCUMENTS

| | | |
|---|---|---|
| WO | 2014145977 | 9/2014 |
| WO | 2014205497 | 12/2014 |

OTHER PUBLICATIONS

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (Draft), NIST (Jan. 2012).

Parra et al. "Statistical Independence and Novelty Detection with Information Preserving Nonlinear Maps." Neural Computation, vol. 8, Iss. 2, Feb. 15, 1996, pp. 260-269.

(56) References Cited

OTHER PUBLICATIONS

Dutta et al. "Distributed Top-K Outlier Detection from Astronomy Catalogs using the DEMAC System." Proceedings of the 2007 SIAM International Conference on Data Mining, 2007, 12 pages.
Ide et al. "Eigenspace-based Anomaly Detection in Computer Systems." KDD—2004 Proceedings of the tenth ACM SIGKDD International Conference on Knowledge Discovery and Data Mining, 2004, pp. 440-449.
Sun et al. "Less is More: Compact Matrix Decomposition for Large Sparse Graphs." Proceedings of the 2007 SIAM International Conference on Data Mining, 2007, 13 pages.
Shyu et al. "A Novel Anomaly Detection Scheme Based on Principal Component Classifier." Miami University Coral Gables FL. Dept. of Electrical and Computer Engineering, 2003, 9 pages.
Fujumaki et al. "An Approach to Spacecraft Anomaly Detection Problem Using Kernel Feature Space." KDD—2005 Proceedings of the Eleventh ACM SIGKDD International Conference on Knowledge Discovery in Data Mining, pp. 401-410.
Yue et al. "Weighted Principal Component Analysis and its Applications to Improve FDC Performance." 43rd IEEE Conference on Decision and Control, Dec. 14-17, 2004, pp. 4262-4267.
Biswas, Trisha. Redundancy-based Approaches in Wireless Multihop Network Design. PhD Dissertalion Submitted to Graduate Faculty of North Carolina State University, Raleigh, North Carolina, Mar. 25, 2014, pp. 1-141 [online], [retrieved on May 26, 2015] Retrieved from the Internet <URL:https://repository.lib.ncsu.edu/bitstream/handle/1840.16/9313/etd.pdf?sequence=2&isAllowed=y>.
Isermann, Rolf. Model-based Fault Detection and Diagnosis—Status and Applications. Institute of Automatic Control, Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.
Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.
Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.
Infor M3 Enterprise Management System. Datasheet [online]. Infor, 2014 [retrieved May 19, 2015]. Retrieved from the Internet: <URL:www.infor.com.html>.
Infor Equipment. Datasheet [online]. Infor, 2012 [retrieved May 19, 2015]. Retrieved from the Internet:<URL:www.infor.com.html>.
Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.
Infor Equipment for Rental. Datasheet [online] Infor, 2013 [retrieved May 19, 2015]. Retrieved from the Internet:<URL: www.infor.com.html>.
Waltermire et al. Applying the Continuous Monitoring Technical Reference Model to the Asset, Configuration, and Vulnerability Management Domains (Draft). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.
International Searching Authority, International Search Report and Written Opinion dated Feb. 7, 2019, issued in connection with International Application No. PCT/US2018/056384, filed on Oct. 17, 2018, 12 pages.
Parra et al. Statistical Independence and Novelty Detection with Information Preserving Nonlinear Maps. Neural Computation, vol. 8, Iss. 2, Feb. 15, 1996, pp. 260-269. [online], [retrieved on Jan. 18, 2018]. Retrieved from the Internet <URL:https://ieeexplore.ieee.org/document/6796568>.
Dutta et al. Distributed Top-K Outlier Detection from Astronomy Catalogs using the DEMAC System. Proceedings of the 2007 SIAM International Conference on Data Mining, 2007, 12 pages, [online], [retrieved on Jan. 18, 2018]. Retrieved from the Internet <URL:https://www.csee.umbc.edu/~hdutta1/SDM07.pdf>.
Ide et al. Eigenspace-based Anomaly Detection in Computer Systems. KDD—2004 Proceedings of the tenth ACM SIGKDD International Conference on Knowledge Discovery and Data Mining, 2004, pp. 440-449 [online], [retrieved Jan. 18, 2018]. Retrieved from the Internet <URL:https://dl.acm.org/doi/10.1145/1014052.1014102>.
Sun et al. Less is More: Compact Matrix Decomposition for Large Sparse Graphs. Proceedings of the 2007 SIAM International Conference on Data Mining, Dec. 10, 2007, 13 pages [online], [retrieved on Jan. 18, 2018]. Retrieved from the Internet <URL: https://onlinelibrary.wiley.com/doi/abs/10.1002/sam.102>.
Shyu et al. A Novel Anomaly Detection Scheme Based on Principal Component Classifier. Miami University Coral Gables FL. Dept. of Electrical and Computer Engineering, Jan. 2003, 9 pages [onine], [retrieved Jan. 18, 2018]. Retrieved from the Internet <URL:https://www.researchgate.net/publication/228709094_A_Novel_Anomaly_Detection_Scheme_Based_on_Principal_Component_Classifier>.
Fujumaki et al. An Approach to Spacecraft Anomaly Detection Problem Using Kernel Feature Space. KDD—2005 Proceedings of the Eleventh ACM SIGKDD International Conference on Knowledge Discovery in Data Mining, Aug. 2005, pp. 401-410 [online], [retrieved on Jan. 18, 2018]. Retrieved from the Internet <URL:https://dl.acm.org/doi/10.1145/1081870.1081917>.
Yue et al. Weighted Principal Component Analysis and its Applications to Improve FDC Performance. 43rd IEEE Conference on Decision and Control, Dec. 14-17, 2004, pp. 4262-4267 [online], [retrieved Jan. 18, 2018]. Retrieved from the Internet <URL:https://www.semanticscholar.org/paper/Weighted-principal-component-analysis-and-its-to-Yue-Tomoyasu/1b9338f28cb74be85-af5336bb3c9aae94f4149b5>.

\* cited by examiner

COMPUTER SYSTEM AND METHOD FOR DETECTING ANOMALIES IN MULTIVARIATE DATA

BACKGROUND

Today, machines (also referred to herein as "assets") are ubiquitous in many industries. From locomotives that transfer cargo across countries to farming equipment that harvest crops, assets play an important role in everyday life. Because of the increasing role that assets play, it is also becoming increasingly desirable to monitor and analyze assets in operation. To facilitate this, some have developed mechanisms to monitor asset attributes and detect abnormal conditions at an asset. For instance, one approach for monitoring assets generally involves various sensors and/or actuators distributed throughout an asset that monitor the operating conditions of the asset and provide signals reflecting the asset's operation to an on-asset computer. As one representative example, if the asset is a locomotive, the sensors and/or actuators may monitor parameters such as temperatures, pressures, fluid levels, voltages, and/or speeds, among other examples. If the signals output by one or more of the sensors and/or actuators reach certain values, the on-asset computer may then generate an abnormal condition indicator, such as a "fault code," which is an indication that an abnormal condition has occurred within the asset. The on-asset computer may also be configured to monitor for, detect, and generate data indicating other events that may occur at the asset, such as asset shutdowns, restarts, etc.

The on-asset computer may also be configured to send data reflecting the attributes of the asset, including operating data such as signal data, abnormal-condition indicators, and/or asset event indicators, to a remote location for further analysis.

OVERVIEW

An organization that is interested in monitoring and analyzing assets in operation may deploy an asset data platform that is configured to receive and analyze various types of asset-related data. For example, the asset data platform may be configured to receive and analyze data indicating asset attributes, such as asset operating data, asset configuration data, asset location data, etc. As another example, the data-analysis platform may be configured to receive and analyze asset maintenance data, such as data regarding inspections, servicing, and/or repairs. As yet another example, the data-analysis platform may be configured to receive and analyze external data that relate to asset operation, such as weather data, traffic data, or the like. The data-analysis platform may be configured to receive and analyze various other types of asset-related data as well.

The asset data platform may receive these asset-related data from various different sources. As one example, the data-analysis platform may receive asset-related data from the assets themselves. As another example, the asset data platform may receive asset-related data from some other platform or system (e.g., an organization's existing platform) that previously received and/or generated asset-related data. As yet another example, the asset data platform may receive asset-related data from an external data source, such as an asset maintenance data repository, a traffic data provider, and/or a weather data provider, for instance. The asset data platform may receive asset-related data from various other sources as well.

In operation, issues may arise at a data source that may lead to anomalies in the data received by the asset data platform. For example, issues may arise at a given asset, such as particular sensors and/or actuators that have failed or are malfunctioning, which may lead to anomalies in the data received from the given asset. In turn, these anomalies may cause undesirable effects at the asset data platform, such as unnecessary alerts and inaccurate predictions. Accordingly, it is generally desirable for the asset data platform to perform anomaly detection on the data that it receives from asset-related data sources.

Certain asset-related data received by the asset data platform may be multivariate in nature. For example, an asset typically includes a set of sensors and/or actuators that each serve to (1) monitor a respective variable that relates to the asset's operation (e.g., engine temperature, fuel levels, R.P.M, etc.) and (2) output a time-sequence of signal values for the monitored variable, where each such value corresponds to a point of time at which the value was measured. As such, the asset's signal data may take the form of a time-sequence of multivariate data, where each respective data point in the sequence comprises a vector of signal values measured by the asset's sensors and/or actuators at a respective point in time. (Additionally, the asset and/or the asset data platform may derive other variables from the asset's signal data, in which case these derived variables may also be included in the multivariate data). In this respect, the set of variables being monitored and/or generated by the asset may be thought of as different dimensions of an observed coordinate space, and each data point in the time-sequence of multivariate data may be thought of as an observation data vector.

In observed multivariate data such as that received from an asset, some variables may be correlated with one another (i.e., the values of some variables may be dependent on the values of other variables), which may make it more difficult to detect anomalies in the multivariate data. To address this issue, an asset data platform may use a component analysis technique that transforms the observed multivariate data from the observed coordinate space to a transformed coordinate space defined by variables that are uncorrelated from each other, which may be referred to as "components."

For instance, the asset data platform may use principal component analysis (PCA), which is a technique that uses linear transformations to transform multivariate data from a first coordinate space defined by an original set of correlated variables to a second coordinate space comprising a set of orthogonal dimensions that are defined by a new set of uncorrelated variables referred to as principal components (PCs). In doing so, PCA effectively removes the covariance of the multivariate data in the observed coordinate space by transforming the data to a set of PCs that have no covariance, where the variance in the PCs "explains" the variance and covariance in the observed coordinate space. PCA may also order the variables of the second coordinate space in order of their variance. As an example, the first variable of the second coordinate space may have the most variance, and the nth variable may have the least variance.

In practice, the asset data platform may use a set of training data that is reflective of normal asset operation to define the transformed coordinate space (e.g., a PCA space defined by a given set of PCs). Once the transformed coordinate space is defined, the asset data platform may then begin transforming (or "projecting") observation data received from a given asset from the observed coordinate space to the transformed coordinate space as a means to improve the detection of anomalies at the given asset. For instance, after transforming the received observation data from the observed coordinate space to the transformed coordinate space, the asset data platform may inversely transform (or "project") the observation data back to the observed coordinate space, which may produce a predicted version of the observation data that comprises an estimate of what the value of the observation data should have been under normal operating conditions. In turn, the asset data platform may analyze the predicted version of the observation data (e.g., by comparing it to the original version of the observation data) to determine whether the observation data is reflective of any anomalies at the given asset.

While the above technique may generally enable an asset data platform to detect anomalies at an asset, this technique may not work well with observation vectors having one or more variables with invalid values (e.g., a value that is missing, outside of an acceptable range, and/or is invalid in some other manner). As such, when an observation vector having one or more variables with invalid values is detected, an asset data platform typically discards the entire observation vector, despite the fact that the majority of the observation vector's values are valid and may provide useful information regarding the operation of an asset.

In addition, multivariate observation vectors from certain asset-related data sources may include variables that are interrelated with one another, which may make it more difficult to detect anomalies that could be occurring in such variables when a technique such as PCA is used. For example, a given multivariate observation vector received from an asset may include a set of interrelated variables related to a subsystem of the asset, where at least one variable in this set represents an input to the subsystem and one or more other variables in this set represent the outputs of the subsystem. In such an example, the "input" variable for the subsystem may drive the values of the one or more "output" variables for the subsystem, in which case this interrelationship may make it more difficult to detect anomalies in these variables when a technique such as PCA is used.

To help address these issues, disclosed herein are techniques that enable an asset data platform to evaluate only a subset of the variables in a multivariate observation vector and then output a predicted version of the multivariate observation vector that includes predicted values for the full set of variables that were originally included in the multivariate observation vector. At a high level, the disclosed techniques may involve using inferential modeling in combination with component analysis to construct an inferential model for an observation vector, which (1) evaluates only a subset of the variables included in the observation vector and then (2) outputs a predicted version of the observation vector comprising a value for each variable that was originally included in the received observation vector (including any one or more variables of the vector that were not included in the evaluated subset of variables). Advantageously, this inferential model may be used in lieu of a standard PCA-based model to perform anomaly detection on observation vectors having variables with invalid values and/or observation vectors having variables that are interrelated with one another.

According to an example embodiment, a data analytics platform may begin by determining the set of variables that are included in multivariate observation vectors output by a given data source, which defines the dimensions of an original coordinate space for the given data source's output data. This original coordinate space may be referred to herein as the "observed full space." For example, if the given data source is an asset that outputs values captured by a set of sensors, these sensor outputs may comprise the set of variables that define the dimensions of an observed full space for the asset's output data. The given data source and the set of variables that define the dimensions of an observed full space may take other forms as well.

After determining the observed full space for the given data source, the data analytics platform may obtain a set of training data vectors that are each representative of "normal" data output by the given data source (e.g., data that do not contain any anomalies or invalid values). In this respect, each training data vector includes the same set of variables included in the given data source's observation vectors and has a valid value for every variable in the set, such that each training data vector "spans" the observed full space of the given data source. For example, if the given data source is an asset that outputs values from a set of sensors, the data analytics platform may obtain a set of training data vectors that are representative of the sensor values output by the asset during normal asset operation (e.g., times when there are no failures, anomalies, and/or other abnormalities detected at the asset), where each training data vector in the set has a valid value for every sensor output that is included in the asset's observation vectors. Other examples are possible as well.

Once the data analytics platform has determined the observed full space and obtained the set of training data vectors for the given data source, the data analytics platform may then be capable of constructing and using an inferential model for an observation vector received from the given data source. In accordance with the present disclosure, this process may generally involve (1) selecting a subset of variables from the observation vector to be evaluated using the inferential model, which define a reduced version of the observed full space referred to herein as an "observed inferential space," (2) representing the set of training data vectors in the observed inferential space (e.g., by removing one or more variables from each training data vector) and then using a component analysis technique (e.g., PCA) to transform the training data vectors from the observed inferential space to a new coordinate space, which may be referred to herein as a "transformed inferential space," (3) transforming the observation vector from the observed inferential space to the transformed inferential space, (4) in the transformed inferential space, comparing the observation vector to the set of training data vectors and thereby identifying a subset of the training data vectors that are closest to the observation vector in the transformed inferential space, and (5) using the identified subset of training data vectors to produce a predicted version of the observation vector in the observed full space that includes valid values for the entire set of variables that define the observed full space. These functions may be implemented by the data analytics platform in various different manners.

For instance, there may be at least two different approaches for performing the inferential modeling techniques disclosed herein, which may be referred to as "vector-by-vector" inferential modeling and "continuous" inferential modeling.

According to the "vector-by-vector" inferential modeling approach, the data analytics platform may decide whether to construct and use an inferential model for an observation vector received from the given data source on a vector-by-vector basis (i.e., "on-the-fly") depending on whether the received observation vector has an invalid value for at least one variable in the observed full space. For instance, the data analytics platform may check each observation vector received from the given data source to determine whether the observation vector has an invalid value for at least one variable in the observed full space (e.g., a value that is missing, outside of an acceptable range, and/or is invalid in some other manner), and if so, the data analytics platform may responsively decide to construct and use an inferential model for the observation vector.

Thus, in the "vector-by-vector" inferential modeling approach, the function of selecting the subset of variables that defines the observed inferential space may occur in response to the determination that an observation vector has an invalid value for at least one variable in the observed full space, and this function may involve selecting a subset of variables that includes only those variables from the observation vector that have valid values and excludes any variable that is determined to have an invalid value. For example, in response to determining that a received observation vector has a given variable with a value that is missing, outside of an acceptable range, and/or is invalid in some other manner, the data analytics platform may decide to construct and use an inferential model to evaluate a subset of variables from the received observation vector that includes all variables except for the given variable, which dictates the particular observed inferential space to use for the given observation vector.

Further, in the "vector-by-vector" inferential modeling approach, the function of representing the set of training data vectors in the observed inferential space and transforming the training data vectors from the observed inferential space to the transformed inferential space may occur after it is determined that a given observation vector includes an invalid value, which dictates the particular observed inferential space to use for the given observation vector. In other words, once the data analytics platform determines that a given observation vector has at least one variable with an invalid value, which dictates the particular observed inferential space to use for the given observation vector, the data analytics platform may represent the set of training data vectors in the observed inferential space (e.g., by removing the at least one variable with the invalid value) and then transform the training data vectors to the particular transformed inferential space corresponding to that particular observed inferential space. As part of this process, the data analytics platform may also store the representations of the training data vectors in the transformed inferential space that corresponds to the observed inferential space, along with an associative mapping for each training data vector that correlates its representation in each of the different coordinate spaces.

However, it is also possible that the data analytics platform could preemptively carry out the function of representing the set of training data vectors in the observed inferential space and transforming the training data vectors from the observed inferential space to the transformed inferential space before determining that an observation vector has an invalid value for at least one variable in the observed full space. For example, after determining the observed full space and obtaining the set of training data vectors for the given data source, the data analytics platform could engage in a preliminary "model definition" phase during which the data analytics platform cycles through different observed inferential spaces that may be possible for the given data source (e.g., different subsets of the variables from an observation vector received from the given data source that may be evaluated using an inferential model) and transforms the set of training data vectors to a respective transformed inferential space corresponding to each such observed inferential space. As part of this process, the data analytics platform may also store the representations of the training data vectors in each of these different observed and transformed inferential spaces, along with an associative mapping for each training data vector that correlates its representation in each of the different coordinate spaces. According to this example, once the data analytics platform determines that a given observation vector has at least one variable with an invalid value, which dictates the particular observed inferential space to use for the given observation vector, the data analytics platform may then access the previously-stored representations of the training data vectors in the transformed inferential space that corresponds to the particular observed inferential space.

The data analytics platform could carry out the function of representing the set of training data vectors in the observed inferential space and transforming the training data vectors from the observed inferential space to the transformed inferential space at other times and/or in other manners as well.

Turning to the "continuous" inferential modeling approach, the data analytics platform may be configured to construct and use an inferential model by default for every observation vector received from the given data source (or at least every observation vector including the set of variables that defines the observed full space for the given data source). For instance, if observation vectors output by the given data source are known to include one or more variables that obscure the ability to detect anomalies in these observation vectors, the data analytics platform may decide to exclude the one or more variables by default when producing the prediction version of every observation vector received from the given data source.

Thus, in the "continuous" inferential modeling approach, the function of selecting the subset of variables that defines the observed inferential space may involve (1) predefining a subset of variables to select for every observation vector received from the given data source, where this predefined subset of variables excludes at least one variable that is known to obscure the ability to detect anomalies in observation vectors received from the given data source, and then (2) selecting the predefined subset of variables for every observation vector received from the given data source. For example, if the observation vectors output by the given data source are known to include one or more "output" variables for a subsystem that are driven by one or more "input" variables for the subsystem, the data analytics platform may predefine a subset of variables to select for every observation vector received from the given data source that includes the "input" variable (among other variables) and excludes the one or more "output" variables.

Further, in the "continuous" inferential modeling approach, the function of representing the set of training data vectors in the observed inferential space and transforming the training data vectors from the observed inferential space to the transformed inferential space may occur during a preliminary "model definition" phase that takes place at or around the time that the data analytics platform predefines the subset of variables to select for every observation vector received from the given data source. In other words, once the data analytics platform predefines the subset of variables to select for every observation vector received from the given data source, which dictates the particular observed inferential space to use for every observation vector received from the given data source, the data analytics platform may represent the set of training data vectors in the observed inferential space (e.g., by removing the one or more variables that are excluded from the predefined subset of variables) and transform the training data vectors to the particular transformed inferential space corresponding to that particular observed inferential space. As part of this process, the data analytics platform may also store the representations of the training data vectors in the observed and transformed inferential spaces, along with an associative mapping for each training data vector that correlates its representation in each of the different coordinate spaces. When the data analytics platform later begins receiving observation vectors from the given data source, the data analytics platform may then access the previously-stored representations of the training data vectors in the transformed inferential space.

However, it is possible that the data analytics platform could carry out the function of representing the set of training data vectors in the observed inferential space and transforming the training data vectors from the observed inferential space to the transformed inferential space at other times and/or in other manners as well.

It should be understood that the inferential modeling techniques disclosed herein are not limited to the "vector-by-vector" and "continuous" inferential modeling approaches, and that other implementations may exist as well. Further, it should be understood that the "vector-by-vector" and "continuous" inferential modeling approaches described herein could be combined, such that the data analytics platform may be configured to use "continuous" inferential modeling to remove a first variable (or variables) by default from every observation vector received from the given data source and may be configured to use "vector-by-vector" inferential modeling to remove any other variable having an invalid value from observation vectors received from the given data source.

Regardless of which inferential modeling approach is used, the disclosed process ultimately involves comparing a given observation vector to the set of training data vectors in the transformed inferential space and thereby identifying a subset of one or more training data vectors that are closest to the given observation vector in the transformed inferential space. The data analytics platform may perform this identification in various manners.

According to one implementation, the data analytics platform may determine a distance in the transformed inferential space between the given observation vector and each training data vector and then identify the subset of one or more training data vectors that are closest to the given observation vector based on the determined distances. For example, the data analytics platform may sort the set of training data vectors according to the determined distances, begin with the training data vector having the shortest distance to the given observation vector in the transformed inferential space, and then proceed in order until the data analytics platform identifies a certain number of training data vectors to include in the subset of one or more training data vectors. As another example, the data analytics platform may identify each training data vector having a distance to the given observation vector in the transformed inferential space that falls below a threshold distance value. The data analytics platform may identify the subset of training data vectors that are closest to the given observation vector in other manners as well.

As part of the process of identifying the subset of training data vectors that are closest to the given observation vector, the data analytics platform may also assign a respective weighting value to each training data vector in the subset that indicates how close the training data vector is to the given observation vector in the transformed inferential space. The data analytics platform may determine the respective weighting value for each training data vector in the subset in various manners. As one possible example, the data analytics platform may take the inverse of the determined distance between the given observation vector and a given training data vector in the transformed inferential space and then assign that inverse as the respective weighting value for the given training data vector. Many other examples are possible as well.

Once the subset of training data vectors closest to the given observation vector in the transformed inferential space have been identified, the disclosed process involves using the identified subset of training data vectors (which include valid values for all variables in the observed full space) to produce a predicted version of the given observation vector in the observed full space that includes valid values for the entire set of variables that define the observed full space. The data analytics platform may perform this function in various manners.

According to one implementation, the data analytics platform may perform a regression analysis on the identified subset of training data vectors in a transformed version of the observed full space, which may be referred to herein the "transformed full space." To perform this analysis, the data analytics platform may first use a component analysis technique (e.g., PCA) to transform the training data vectors from the observed full space to the transformed full space. In practice, the data analytics platform may perform this transformation at any point between the time that the set of training data for the given data source is identified and the time that the regression analysis is to be performed in the transformed full space. For example, the data analytics platform may transform the set of training data vectors from the observed full space to the transformed full space during a preliminary "model definition" phase that takes place at or around the time that the data analytics platform identifies the set of training data for the given data source. In another example, the data analytics platform may transform the set of training data vectors from the observed full space to the transformed full space at or around the time that the data analytics platform identifies the subset of training data vectors that are closest to the given observation vector in the transformed inferential space. Other examples are possible as well.

As part of the process of transforming the set of training data vectors from the observed full space to the transformed full space, the data analytics platform may also store the representations of the training data vectors in the transformed full space, along with an associative mapping for each training data vector in the set that correlates its representation in each different coordinate space. The data analytics platform may then use the associative mapping for each training data vector in the identified subset of training data vectors to obtain the representation of each such training data vector in the transformed full space.

In turn, the data analytics platform may perform a regression analysis on the representations of the identified subset of training data vectors in the transformed full space to produce a predicted version of the given observation vector in the transformed full space. The data analytics platform may perform this regression analysis using any nonparametric regression technique designed to calculate a prediction from a group of localized multivariate vectors. According to one possible example, such a regression analysis may involve calculating a weighted average of the identified subset of training data vectors in the transformed full space. In this respect, the data analytics platform's calculation of the weighted average may be based on the weighting values discussed above and/or some other set of weighting values.

Lastly, the data analytics platform may inversely transform (or project) the predicted version of the given observation vector from the transformed full space to the observed full space. This results in a predicted version of the given observation vector in the observed full space that includes valid values for the entire set of variables that define the observed full space.

According to another implementation, the data analytics platform may perform a regression analysis on the identified subset of training data vectors in the observed full space. For instance, once the subset of training data vectors closest to the given observation vector in the transformed inferential space have been identified, the data analytics platform may obtain the representation of each such training data vector in the observed full space (e.g., by using associative mappings that correlate the training data vectors' representations in the transformed inferential space with their representations in the observed full space). In turn, the data analytics platform may perform a regression analysis on the representations of the identified subset of training data vectors in the observed full space to produce a predicted version of the given observation vector in the observed full space that includes valid values for the entire set of variables that define the observed full space. As above, the data analytics platform may perform this regression analysis using any nonparametric regression technique designed to calculate a prediction from a group of localized multivariate vectors, including a weighted average calculation.

The data analytics platform may produce a predicted version of the given observation vector based on the subset of training data vectors using other techniques as well, including but not limited to techniques that involve the use of a localized regression algorithm in the observed/transformed and/or inferential/full spaces.

Once the data analytics platform has produced the predicted version of the observation data vector, the data analytics platform may then use the predicted version of the given observation vector to analyze for and potentially detect anomalies in the data received from the given data source. For instance, if the given data source is an asset, the data analytics platform may then use the predicted version of the given observation vector to perform an analysis of whether the data output by the asset are anomalous, which may be indicative of a problem at the asset. As one example, such an analysis may involve an assessment of how the predicted version of the observation data compares to the version of the observation data in the observed full space over some period of time, in order to identify instances when one or more variables in the observation data appear to be anomalous (e.g., instances when statistically-significant discrepancies exist in at least one variable value between the original and predicted versions of the observation data). Based on this analysis, the data analytics platform may generate notifications of such anomalies, which may be presented to users of the platform. The data analytics platform may also perform various other functions based on the data generated by the process described above.

One of ordinary skill in the art will appreciate these as well as numerous other aspects in reading the following disclosure.

Accordingly, in one aspect, disclosed herein is a method for detecting anomalies that involves (a) obtaining a set of training data vectors for a given asset-related data source, wherein the given asset-related data source outputs observation vectors related to asset operation, wherein the observation vectors output by the given asset-related data source comprise a given set of variables that defines an observed full coordinate space, and wherein each training data vector in the set of training data vectors is reflective of normal asset operation and includes a valid value for each variable in the observed full space, (b) representing the set of training data vectors in an observed inferential space that is defined by a given subset of the given set of variables and then transforming the training data vectors from the observed inferential space to a transformed inferential space, (c) transforming a given observation vector received from the given asset-related data source from the observed inferential space to the transformed inferential space, (d) performing a comparison in the transformed inferential space between the given observation vector and the set of training data vectors, (e) based on the comparison, identifying a subset of training data vectors that are closest to the given observation vector in the transformed inferential space, (f) using the identified subset of training data vectors to produce a predicted version of the given observation vector in the observed full space that has a valid value for each variable in the observed full space, and (g) using the predicted version of the given observation vector to determine whether an anomaly has occurred at the given asset.

In another aspect, disclosed herein is a computing system comprising a network interface, at least one processor, a non-transitory computer-readable medium, and program instructions stored on the non-transitory computer-readable medium that are executable by the at least one processor to cause the computing system to carry out functions associated with the disclosed method for detecting anomalies.

In yet another aspect, disclosed herein is a non-transitory computer-readable medium having instructions stored thereon that are executable to cause a computing system to carry out functions associated with the disclosed method for detecting anomalies.

One of ordinary skill in the art will appreciate these as well as numerous other aspects in reading the following disclosure.

BRIEF DESCRIPTION OF THE DRAWINGS

Please note that this patent or application file contains at least one drawing executed in color. Copies of this patent or patent application publication with color drawing(s) will be provided by the Office upon request and payment of the necessary fee.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
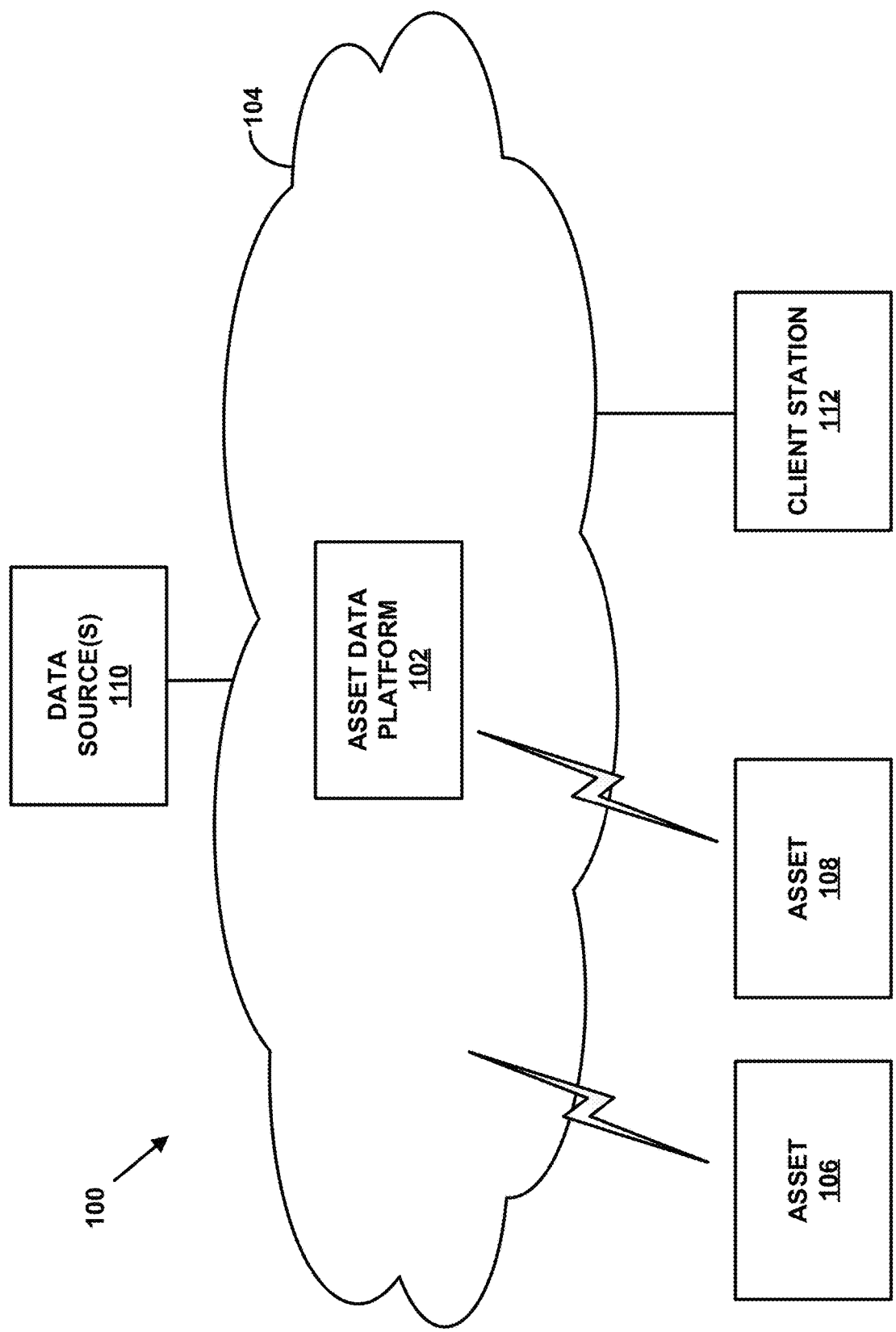
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL DATA-FLOW® or NIFI®, among other examples. The platform may take other forms as well. Asset data platform 102 is discussed in further detail below with reference to FIG. 4.

As shown in FIG. 1, asset data platform 102 may be configured to communicate, via the communication network 104, with the one or more assets, data sources, and/or output systems in the network configuration 100. For example, asset data platform 102 may receive asset-related data, via the communication network 104, that is sent by one or more assets and/or data sources. As another example, asset data platform 102 may transmit asset-related data and/or commands, via the communication network 104, for receipt by an output system, such as a client station, a work-order system, a parts-ordering system, etc. Asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WIFI®, BLUETOOTH®, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between asset data platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and asset data platform 102 may then be configured to receive the asset-related data from the one or more intermediary systems. As another example, asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. These data may take various forms, examples of which may include signal data (e.g., sensor/actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), unmanned aerial vehicles, and data network nodes (e.g., personal computers, routers, bridges, gateways, switches, etc.), among other examples. Additionally, the assets of each given type may have various different configurations (e.g., brand, make, model, software version, etc.).

As such, in some examples, the assets 106 and 108 may each be of the same type (e.g., a fleet of locomotives or aircrafts, a group of wind turbines, a pool of milling machines, or a set of magnetic resonance imagining (MM) machines, among other examples) and perhaps may have the same configuration (e.g., the same brand, make, model, firmware version, etc.). In other examples, the assets 106 and 108 may have different asset types or different configurations (e.g., different brands, makes, models, and/or software versions). For instance, assets 106 and 108 may be different pieces of equipment at a job site (e.g., an excavation site) or a production facility, or different nodes in a data network, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that are related to the assets or is otherwise relevant to the functions performed by asset data platform 102. For example, the data source 110 may collect and provide operating data that originate from the assets (e.g., historical operating data, training data, etc.), in which case the data source 110 may serve as an alternative source for such asset operating data. As another example, the data source 110 may be configured to provide data that do not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, asset data platform 102 may receive data from the data source 110 by "subscribing" to a service provided by the data source. However, asset data platform 102 may receive data from the data source 110 in other manners as well.

The client station 112 may take the form of a computing system or device configured to access and enable a user to interact with asset data platform 102. To facilitate this, the client station may include hardware components such as a user interface, a network interface, a processor, and data storage, among other components. Additionally, the client station may be configured with software components that enable interaction with asset data platform 102, such as a web browser that is capable of accessing a web application provided by asset data platform 102 or a native client application associated with asset data platform 102, among other examples. Representative examples of client stations may include a desktop computer, a laptop, a netbook, a tablet, a smartphone, a personal digital assistant (PDA), or any other such device now known or later developed.

Other examples of output systems may include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or fewer of the pictured components.

II. EXAMPLE ASSET

Figure 2:
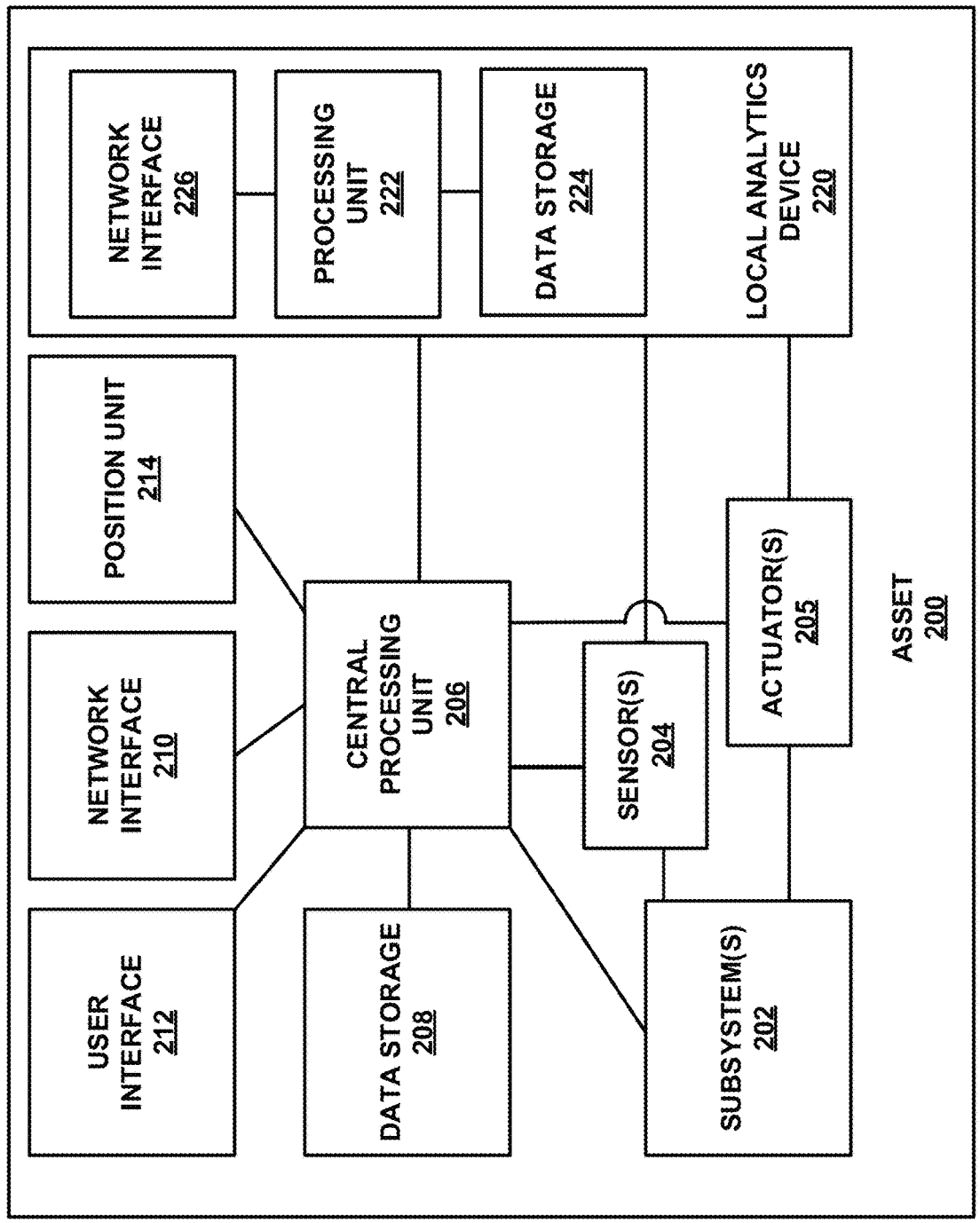
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, electromechanical, and/or electronic components that are configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Depending on the asset's type and/or configuration, it should be understood that the asset 200 may additionally or alternatively include other components and/or mechanisms for monitoring the operation of the asset 200. As one possibility, the asset 200 may employ software-based mechanisms for monitoring certain aspects of the asset's operation (e.g., network activity, computer resource utilization, etc.), which may be embodied as program instructions that are stored in data storage 208 and are executable by the central processing unit 206.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data and later access them from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators such as fault codes, which are a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
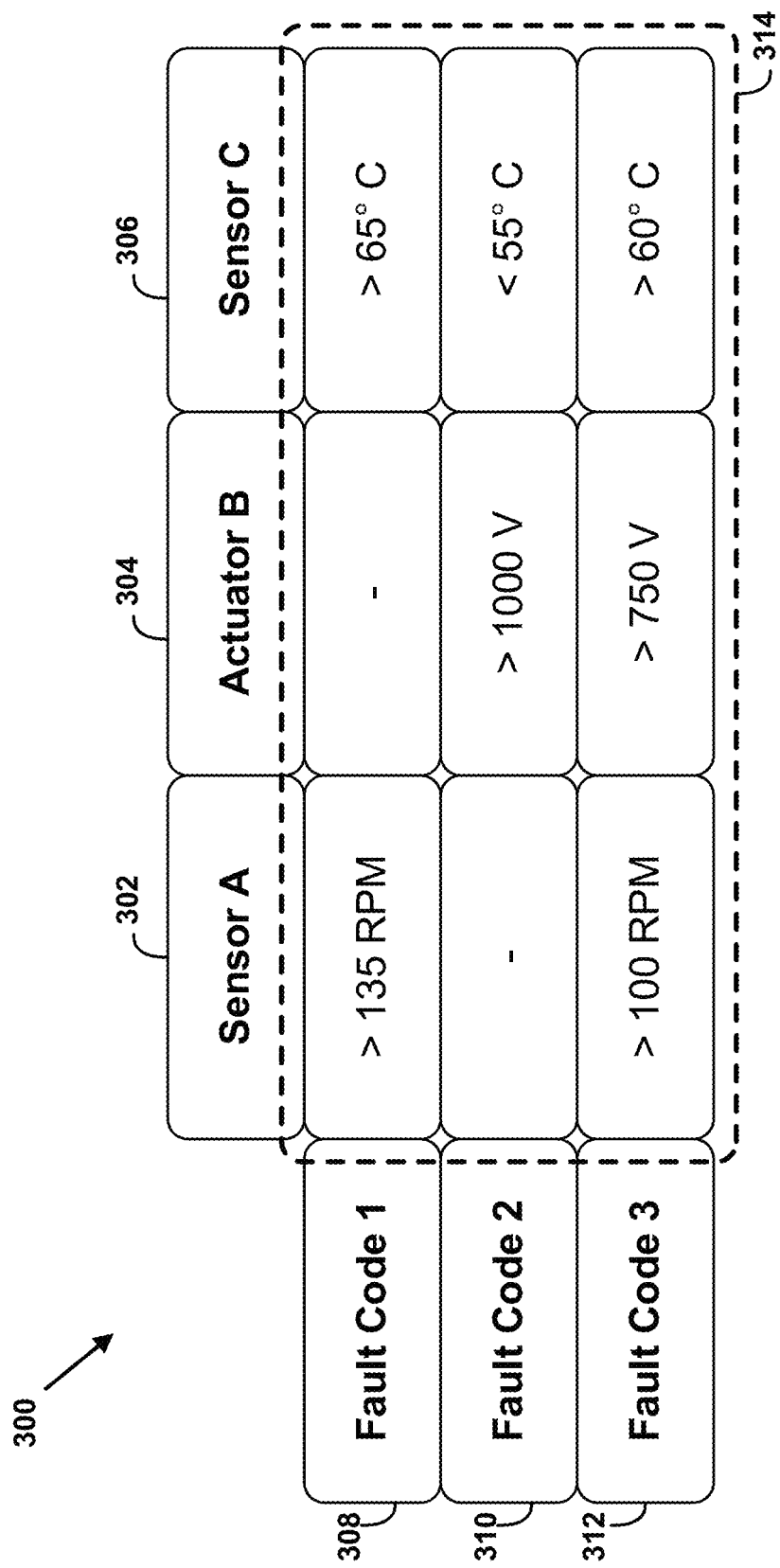
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS®, GLONASS®, GALILEO®, BEIDOU®, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., asset data platform 102) position data that indicate the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that are generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, depending on the asset type, other assets may include additional components not pictured and/or more or less of the pictured components. Moreover, a given asset may include multiple, individual assets that are operated in concert to perform operations of the given asset. Other examples are also possible.

III. EXAMPLE PLATFORM

Figure 4:
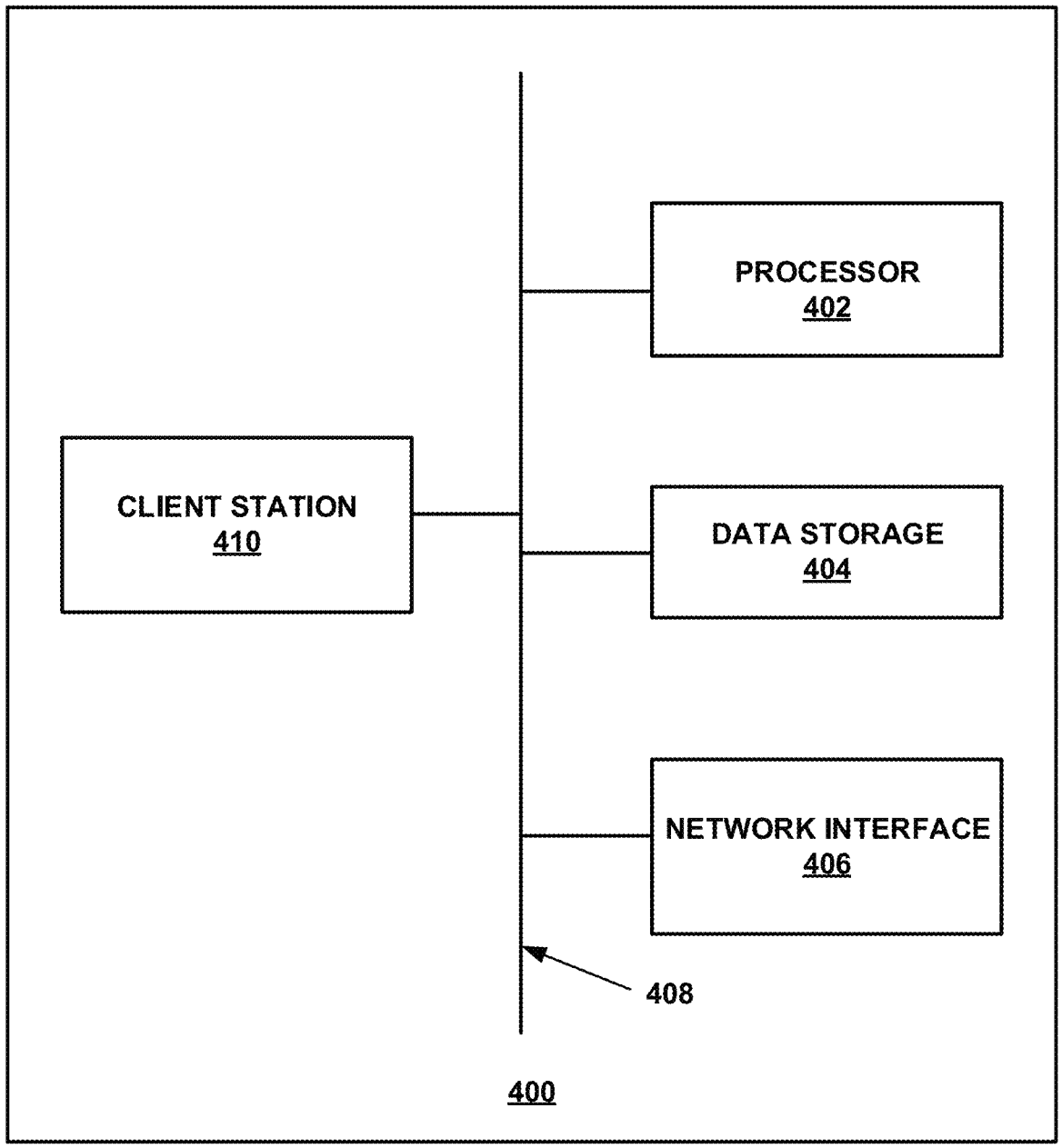
FIG. 4 depicts a structural diagram of an example platform.

FIG. 4 is a simplified block diagram illustrating some components that may be included in an example data asset platform 400 from a structural perspective. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage media, examples of which may include volatile storage media such as random access memory, registers, cache, etc. and non-volatile storage media such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., FIREWIRE®, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include HADOOP®, FTP, relational databases, high frequency data such as OSI PI, batch data such as XML, and BASE64®. Other configurations are possible as well.

The example data asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
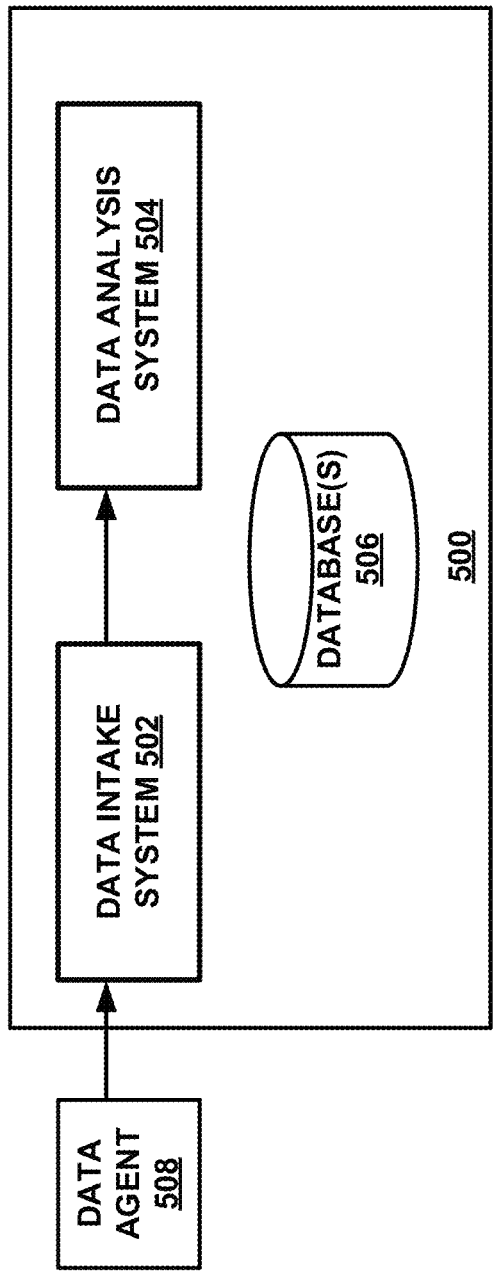
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NIFI® receiver or the like.

In some embodiments, before the data intake system 502 receives data from a given source (e.g., an asset, an organization's existing platform/system, an external asset-related data source, etc.), that source may be provisioned with a data agent 508. In general, the data agent 508 may be a software component that functions to access asset-related data at the given data source, place the data in the appropriate format, and then facilitate the transmission of the data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset-related data to the example platform 500 without the assistance of a data agent.

The asset-related data received by the data intake system 502 may take various forms. As one example, the asset-related data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originate. These attributes may come in the form of signal signatures or metadata, among other examples. The asset-related data received by the data intake system 502 may take other forms as well.

The data intake system 502 may also be configured to perform various pre-processing functions on the asset-related data, in an effort to provide data to the data analysis system 504 that are clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain unreliable data. As yet another example, the data intake system 502 may "de-dup" the received data by identifying any data already received by the platform and then ignoring or dropping such data. As still another example, the data intake system 502 may determine that the received data are related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permits more rapid searching (e.g., a relational database). In such an example, the metadata may then be linked or associated to the asset-related data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that fall into three general categories: (1) signal data, (2) event data, and (3) asset configuration data. The signal data may generally take the form of raw, aggregated, or derived data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. Asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze the data, and then take various actions based on the data. These actions may take various forms.

As one example, the data analysis system 504 may identify certain data that are to be output to a client station (e.g., based on a request received from the client station) and may then provide the data to the client station. As another example, the data analysis system 504 may determine that certain data satisfy a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset-related data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. EXAMPLE OPERATIONS

The operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where a single data source, such as the asset 106, provides data to asset data platform 102 that then performs one or more functions. It should be understood that this is done merely for sake of clarity and explanation and is not meant to be limiting. In practice, asset data platform 102 generally receives data from multiple sources, perhaps simultaneously, and performs operations based on such aggregate received data.

A. Collection of Operating Data

As mentioned above, each of the representative assets 106 and 108 may take various forms and may be configured to perform a number of operations. In a non-limiting example, the asset 106 may take the form of a locomotive that is operable to transfer cargo across the United States. While in transit, the sensors and/or actuators of the asset 106 may obtain data that reflects one or more operating conditions of the asset 106. The sensors and/or actuators may transmit the data to a processing unit of the asset 106.

The asset's processing unit may be configured to receive the data from the sensors and/or actuators. In practice, the processing unit may receive signal data from multiple sensors and/or multiple actuators simultaneously or sequentially. As discussed above, while receiving the data, the processing unit may be configured to determine whether the data satisfy triggering criteria that trigger any abnormal-condition indicators, otherwise referred to as a fault, such as fault codes, which is fault data that serve as an indication that an abnormal condition has occurred within the asset. In the event the processing unit determines that one or more abnormal-condition indicators are triggered, the processing unit may be configured to perform one or more local operations, such as outputting an indication of the triggered indicator via a user interface. The processing unit may also be configured to derive other data from the signal data received from the sensors and/or actuators (e.g., aggregations of such data) and the derived data may be included with the signal data.

Additionally or alternatively, the processing unit may execute program instructions that embody software-based mechanisms for monitoring aspects of the asset's operation, such as the network activity and/or computer resource utilization of the asset 106, in which case the processing unit may generate operating data that are indicative of this operation.

The asset 106 may then transmit asset attribute data—such as asset operating data and/or asset configuration data—to asset data platform 102 via a network interface of the asset 106 and the communication network 104. In operation, the asset 106 may transmit asset attribute data to asset data platform 102 continuously, periodically, and/or in response to triggering events (e.g., abnormal conditions). Specifically, the asset 106 may transmit asset attribute data periodically based on a particular frequency (e.g., daily, hourly, every fifteen minutes, once per minute, once per second, etc.), or the asset 106 may be configured to transmit a continuous, real-time feed of operating data. Additionally or alternatively, the asset 106 may be configured to transmit asset attribute data based on certain triggers, such as when sensor and/or actuator measurements satisfy triggering criteria for any abnormal-condition indicators. The asset 106 may transmit asset attribute data in other manners as well.

In practice, asset operating data for the asset 106 may include signal data (e.g., sensor, actuator data, network activity data, computer resource utilization data, etc.), fault data, and/or other asset event data (e.g., data indicating asset shutdowns, restarts, diagnostic operations, fluid inspections, repairs, etc.). In some implementations, the asset 106 may be configured to provide the data in a single data stream, while in other implementations the asset 106 may be configured to provide the operating data in multiple, distinct data streams. For example, the asset 106 may provide to asset data platform 102 a first data stream of signal data and a second data stream of fault data. As another example, the asset 106 may provide to asset data platform 102 a separate data stream for each respective sensor and/or actuator on the asset 106. Other possibilities also exist.

Signal data may take various forms. For example, at times, sensor data (or actuator data) may include measurements obtained by each of the sensors (or actuators) of the asset 106. While at other times, sensor data (or actuator data) may include measurements obtained by a subset of the sensors (or actuators) of the asset 106.

Specifically, the signal data may include measurements obtained by the sensors and/or actuators associated with a given triggered abnormal-condition indicator. For example, if a triggered fault code is Fault Code 1 from FIG. 3, then sensor data may include raw measurements obtained by Sensors A and C. Additionally or alternatively, the data may include measurements obtained by one or more sensors or actuators not directly associated with the triggered fault code. Continuing off the last example, the data may additionally include measurements obtained by Actuator B and/or other sensors or actuators. In some examples, the asset 106 may include particular sensor data in the operating data based on a fault-code rule or instruction provided by the analytics system 108, which may have, for example, determined that there is a correlation between that which Actuator B is measuring and that which caused the Fault Code 1 to be triggered in the first place. Other examples are also possible.

Further still, the data may include one or more sensor and/or actuator measurements from each sensor and/or actuator of interest based on a particular time of interest, which may be selected based on a number of factors. In some examples, the particular time of interest may be based on a sampling rate. In other examples, the particular time of interest may be based on the time at which a fault is detected.

In particular, based on the time at which a fault is detected, the data may include one or more respective sensor and/or actuator measurements from each sensor and/or actuator of interest (e.g., sensors and/or actuators directly and indirectly associated with the detected fault). The one or more measurements may be based on a particular number of measurements or particular duration of time around the time of the detected fault.

For example, if the asset detects a fault that triggers Fault Code 2 from FIG. 3, the sensors and actuators of interest might include Actuator B and Sensor C. The one or more measurements may include the respective set measurements obtained by Actuator B and Sensor C at the time the fault was detected, shortly before the time of the fault detection, shortly after the time of the fault detection, and/or some combination thereof.

Similar to signal data, the fault data may take various forms. In general, the fault data may include or take the form of an indicator that is operable to uniquely identify the particular type of fault that occurred at the asset 106 from all other types of faults that may occur at the asset 106. This indicator, which may be referred to as a fault code, may take the form of an alphabetic, numeric, or alphanumeric identifier, or may take the form of a string of words that is descriptive of the fault type, such as "Overheated Engine" or "Out of Fuel," among other examples. Additionally, the fault data may include other information regarding the fault occurrence, including indications of when the fault occurred (e.g., a timestamp) and where the fault occurred (e.g., GPS data), among other examples. Data relating to other types of events (e.g., maintenance events) may take a similar form.

Moreover, the asset configuration data may take a variety of forms as well. Generally, the asset configuration data pertain to information "about" an asset. In one instance, asset configuration data may include data asset identification information, such as model number, model year (e.g., asset age), etc. In another instance, the asset data directly relate to a particular past and/or present configuration of the asset. For example, the asset attribute information may indicate which software versions are installed and/or running on the asset, after market modifications made to an asset, among other possibilities.

Asset data platform 102, and in particular, the data intake system of asset data platform 102, may be configured to receive asset attribute data from one or more assets and/or data sources. The data intake system may be configured to intake at least a portion of the received data, perform one or more operations to the received data, and then relay the data to the data analysis system of asset data platform 102. In turn, the data analysis system may analyze the received data, and based on such analysis, perform one or more operations.

B. Detection of Anomalies in Multivariate Data Having One or More Invalid Values As described above, asset data platform 102 may receive multivariate observation data from an asset-related data source (e.g., one of assets 106 or 108), where the multivariate observation data comprise a stream of multivariate observation vectors. Asset data platform 102 may generally use these observation vectors to analyze the operation of the asset, e.g., to predict that an anomaly has occurred (or is likely to occur in the future) at the asset. However, if asset data platform 102 receives a given observation vector having that one or more of the values that are invalid (e.g., a value that is missing, outside of an acceptable range, and/or is invalid in some other manner), asset data platform 102 may be unable to analyze the given observation vector using the same anomaly detection model that it uses to analyze observation vectors having a full set of valid values.

In addition, multivariate observation vectors from an asset-related data source may include variables that are interrelated with one another, which may make it more difficult to detect anomalies that could be occurring in such variables when a standard anomaly detection model is used. For example, a given multivariate observation vector received from asset 106 may include a set of interrelated variables related to a subsystem of the asset, where at least one variable in this set represents an input to the subsystem and one or more other variables in this set represent the outputs of the subsystem. In such an example, the "input" variable for the subsystem may drive the values of the one or more "output" variables for the subsystem, in which case this interrelationship may make it more difficult to detect anomalies in these variables when a standard anomaly detection model is used.

To help address these issues, disclosed herein are techniques that enable asset data platform 102 to evaluate only a subset of the variables in a multivariate observation vector and then output a predicted version of the multivariate observation vector that includes predicted values for the full set of variables that was originally included in the multivariate observation vector. At a high level, the disclosed techniques may involve using inferential modeling in combination with component analysis to construct an inferential model for an observation vector, which (1) evaluates only a subset of the variables included in the observation vector and then (2) outputs a predicted version of the observation vector comprising a value for each variable that was originally included in the received observation vector (including any one or more variables of the vector that were not included in the evaluated subset of variables). Advantageously, this inferential model may be used in lieu of a standard model to perform anomaly detection on observation vectors having variables with invalid values and/or observation vectors having variables that are interrelated with one another.

Figure 6:
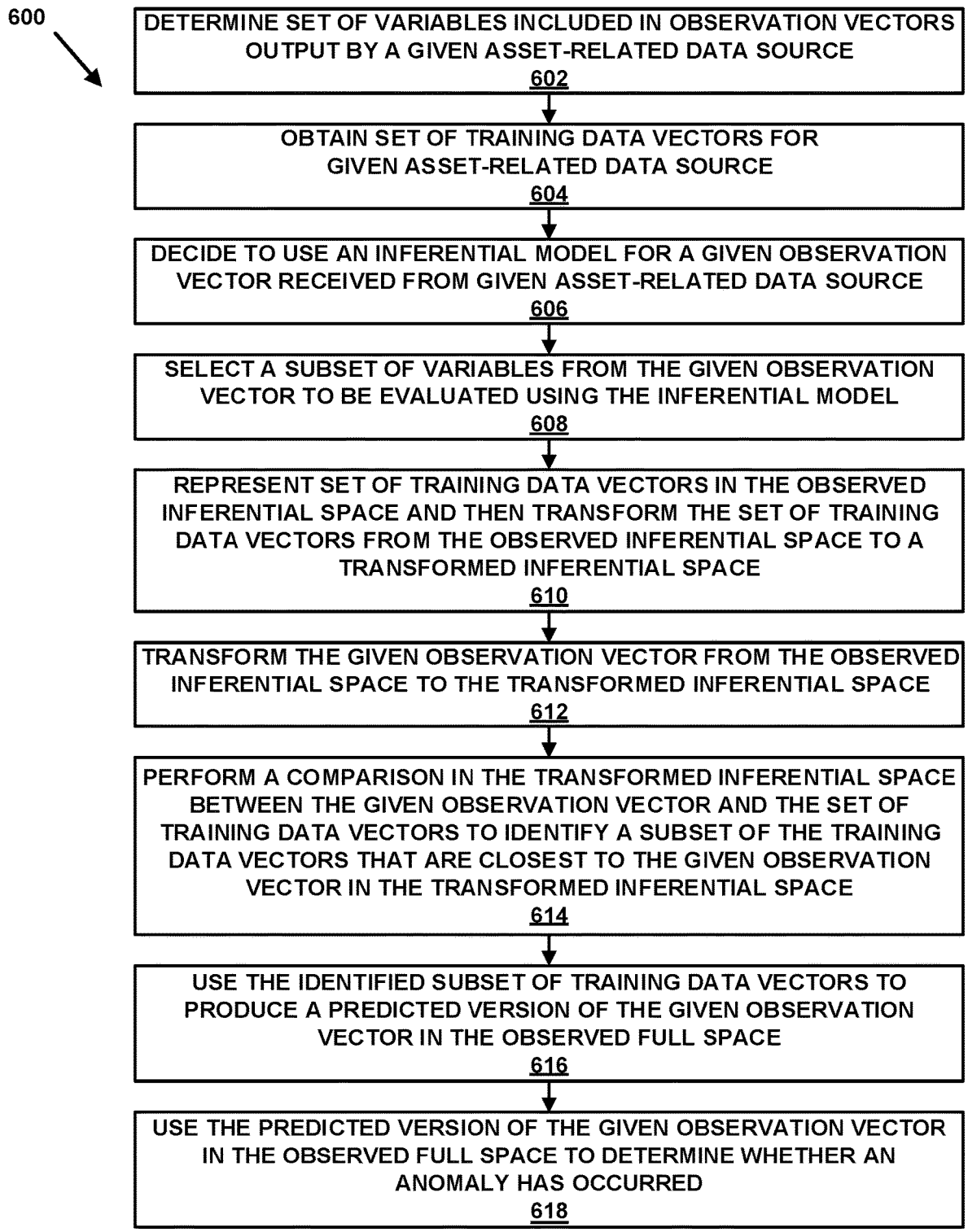
FIG. 6 is a flow diagram that depicts an example method for constructing and using an inferential model to perform anomaly detection.

Turning now to FIG. 6, a flow chart 600 is shown that illustrates example functions that may be carried out in connection with an example method for constructing and using an inferential model to detect anomalies in multivariate observation data. For the purposes of illustration, the example functions are described as being carried out by asset data platform 102. However, it should be understood that computing systems or devices other than asset data platform 102 may perform the example functions. Likewise, it should be understood that flow diagram 600 is provided for sake of clarity and explanation and that numerous other combinations of functions may be utilized to facilitate identification of anomalies in multivariate data—including the possibility that example functions may be added, removed, rearranged into different orders, combined into fewer blocks, and/or separated into additional blocks depending upon the particular embodiment.

At block 602, asset data platform 102 may identify the set of variables that are included in multivariate observation vectors output by a given asset-related data source, which defines the dimensions of an original coordinate space for the given asset-related data source. This original coordinate space may be referred to herein as the "observed full space."

The given asset-related data source and the multivariate observation vectors output by the given asset-related data source may take various different forms. As one possibility, the given asset-related data source may be an asset that outputs multivariable observation vectors. For instance, a representative asset—such as asset 106 and/or asset 108—may include a set of sensors and/or actuators that each serve to monitor a respective variable related to the asset's operation (e.g., engine temperature, fluid levels, R.P.M., etc.) and output a time-sequence of signal values for the monitored variable, where each value corresponds to a point of time the value was measured. Additionally or alternatively, a representative asset—such as asset 106 and/or asset 108—may employ software-based mechanisms that serve to monitor one or more variables related to the asset's operation (e.g., network activity and/or computer resource utilization of the asset) and output a time-sequence of signal values for each such variable, where each value corresponds to a point of time the value was measured. As such, the asset's signal data may take the form of a time-sequence of multivariate data, where each respective data point in the sequence comprises an observation data vector that includes a collection of signal values captured by the asset at a respective point in time. (Additionally, the asset and/or asset data platform 102 may derive other variables from the asset's signal data, in which case these derived variables may also be included in the multivariate data). In this respect, the asset data platform may determine the set of variables being monitored and/or generated by the asset, which define the dimensions of the observed full space for the asset.

The given asset-related data source and/or the multivariate observation vectors output by the given asset-related data source may take other forms as well.

At block 604, after determining the observed full space for the given asset-related data source, asset data platform 102 may obtain a set of training data vectors that are each representative of "normal" data output by given asset-related data source (e.g., data that do not contain any anomalies or invalid values). In this respect, each training data vector includes the same set of variables included in the given asset-related data source's observation vectors and has a valid value for every variable in the set, such that each training data vector "spans" the observed full space of the given asset-related data source.

For instance, if the given asset-related data source is asset 106, asset data platform 102 may obtain a set of training data vectors that are representative of the multivariate vectors output by asset 106 during normal operation (e.g., times when there are no failures, anomalies, and/or other abnormalities detected at asset 106), where each training data vector in the set has a valid value for every variable that is included in the observation vectors output by asset 106. These training data vectors for asset 106 may take various forms.

In one implementation, the training data vectors for asset 106 may include historical observation vectors that were previously output by asset 106 and/or other similar assets during times when such assets were known to have been operating normally. In such an implementation, asset data platform 102 (or some other entity) may determine which particular historical observation vectors to include in the set of training data vectors in various manners. As one possibility, asset data platform 102 may apply a set of criteria that defines "normal" asset operation to a stored collection of historical observation vectors for asset 106 and/or other similar assets in order to identify a particular set of historical observation vectors that satisfy the criteria (e.g., historical observation vectors that were not associated with failures, anomalies, and/or other abnormalities at asset 106). In turn, asset data platform 102 may either include this entire set of historical observation vectors in the set of training data vectors for asset 106, or may further narrow the set of historical observation vectors before identifying the set of training data vectors for asset 106 (e.g., based on the analysis of the distribution of the historical observation vectors satisfying the criteria). Asset data platform 102 may determine which particular historical observation vectors to include in the set of training data vectors in other manners as well.

In another implementation, the training data vectors for asset 106 may comprise derived vectors that are generated by asset data platform 102 (or another entity) based on historical observation vectors that were previously output by asset 106 and/or other similar assets. For instance, asset data platform 102 may identify a collection of historical observation vectors that were previously output by asset 106 and/or other similar assets during times when such assets were known to have been operating normally and then aggregate this collection of historical observation vectors in various manners (e.g., by calculating "average" observation vectors on an asset-by-asset basis, a day-by-day basis, etc.). Asset data platform 102 may generate derived vectors to include in the set of training data for asset 106 in other manners as well.

The set of training data vectors for asset 106 may take other forms as well, including the possibility that the set training data vectors may include a combination of different types of vectors (e.g., both historical training data vectors and derived vectors).

Once asset data platform 102 has determined the observed full space and obtained the set of training data vectors for the given asset-related data source, the asset data platform may then be capable of constructing and using an inferential model for an observation vector received from the given asset-related data source. In this respect, as discussed above, there may be at least two different approaches for performing the inferential modeling techniques disclosed herein, which may be referred to as "vector-by-vector" inferential modeling and "continuous" inferential modeling.

According to the "vector-by-vector" inferential modeling approach, asset data platform 102 may decide whether to construct and use an inferential model for an observation vector received from the given asset-related data source on a vector-by-vector basis (i.e., "on-the-fly") depending on whether received observation vector has an invalid value for at least one variable in the observed full space. For instance, asset data platform 102 may check each observation vector received from the given asset-related data source to determine whether the observation vector has an invalid value for at least one variable in the observed full space (e.g., a value that is missing, outside of an acceptable range, and/or is invalid in some other manner), and if so, asset data platform 102 may responsively decide to construct and use an inferential model for the observation vector.

Alternatively, according to the "continuous" inferential modeling approach, asset data platform 102 may be configured to construct and use an inferential model by default for every observation vector received from the given asset-related data source (or at least every observation vector including the set of variables that defines the observed full space for the given asset-related data source). For instance, if observation vectors output by the given asset-related data source are known to include one or more variables that obscure the ability to detect anomalies in these observation vectors, asset data platform 102 may decide to exclude the one or more variables by default when producing the prediction version of every observation vector received from the given asset-related data source.

It is also possible that the "vector-by-vector" and "continuous" inferential modeling approaches described herein could be combined, such that asset data platform 102 may be configured to use "continuous" inferential modeling to remove a first variable (or variables) by default from every observation vector received from the given asset-related data source and may be configured to use "vector-by-vector" inferential modeling to remove any other variable having an invalid value from the observation variables received from the given asset-related data source. Other inferential modeling approaches may exist as well.

Depending on which inferential modeling approach is used, it is possible that certain of the example functions that follow may occur in different orders and/or take different forms. These variations are discussed in further detail below.

At block 606, asset data platform 102 may decide to construct and use an inferential model for a given observation vector received from the given asset-related data source. Depending on the inferential modeling approach being used, this function may take various forms.

For instance, if a "vector-by-vector" inferential modeling approach is being used, asset data platform 102 may decide to construct and use an inferential model for a given observation vector received from the given asset-related data source in response to determining that the given observation vector has an invalid value for at least one variable in the observed full space, such as a value that is missing, outside of an acceptable range, and/or invalid in some other manner. Asset data platform 102 may perform this determination in various manners.

As one possibility, after receiving the given observation vector, asset data platform 102 may determine that there is no value included in the given observation vector for at least one variable and/or that at least one variable included in the given observation vector has a special value that is indicative of a missing, such as a "not-a-number" (NaN) value or a null value.

As another possibility, after receiving the given observation vector, asset data platform 102 may determine that at least one variable included in the given observation vector has a value that is outside of an acceptable range. For example, asset data platform 102 may determine that a variable's value is outside of an acceptable range for the variable as a result of comparing the value to a set of predefined threshold values for the variable. As another example, asset data platform 102 may determine that a variable's value is outside of an acceptable range for the variable based on an analysis of that value in the context of the other variables' values, in which case asset data platform 102 may be configured with logic for performing this analysis. As yet another example, asset data platform 102 may determine that a variable's value is outside of an acceptable range for the variable based on an analysis of the value in the context of other historical values for that variable (e.g., by analyzing whether the value is skewed or biased relative to a typical distribution of values for the variable). Other approaches for determining that a variable's value is outside of an acceptable range are possible as well.

As yet another possibility, asset data platform 102 may determine that at least one variable included in the given observation vector has a value that is invalid because it is in a wrong format and/or otherwise cannot be evaluated by asset data platform 102.

Asset data platform 102 may determine that the given observation vector has an invalid value for at least one variable in the observed full space in other manners as well.

On the other hand, if a "continuous" inferential modeling approach is being used such that asset data platform 102 is configured to construct and use an inferential model by default for every observation vector received from the given asset-related data source, asset data platform 102 may decide to construct and use an inferential model for the given observation vector upon receiving the given observation vector.

It is also possible that asset data platform 102 may decide to construct and use an inferential model for the given observation vector using other approaches as well.

At block 608, asset data platform 102 may select a subset of variables from the given observation vector to be evaluated using the inferential model, which define a reduced version of the observed full space referred to herein as an "observed inferential space." In other words, each respective variable included in the selected subset of variables defines a respective dimension in the observed inferential space.

In practice, the function of selecting the subset of variables from the given observation vector to be evaluated using the inferential model may involve removing at least one variable from the given observation vector, such as a variable that has an invalid value or is known to obscure the detection of anomalies. For example, if an observation vector includes n total variables, asset data platform 102 may decide to remove at least one variable from the given observation vector to be evaluated using the inferential model and thereby reduce the given observation vector to a subset of variables that defines an observed inferential space having n–1 dimensions. Other examples may involve removing more than one variable from the observation vector, in which case the selected subset of variables may define an observed inferential space having a lesser number of dimensions (e.g., n–2 dimensions, n–3 dimensions, etc.).

Depending on the inferential modeling approach being used, this function of selecting the subset of variables that defines the observed inferential space may take various forms. For instance, if a "vector-by-vector" inferential modeling approach is being used such that asset data platform 102 has determined that the given observation vector has an invalid value for at least one variable in the observed full space, asset data platform 102 may select a subset of variables from the given observation vector that includes only those variables having valid values and excludes any variable that is determined to have an invalid value. In other words, in response to determining that the given observation vector has a given variable with a value that is missing, outside of an acceptable range, and/or is invalid in some other manner, asset data platform 102 may decide to construct and use an inferential model to evaluate a subset of variables from the given observation vector that includes all variables except for the given variable.

On the other hand, if a "continuous" inferential modeling approach is being used, asset data platform 102 may be configured to select the same predefined subset of variables from every observation vector received from the given asset-related data source. For instance, asset data platform 102 may predefine a subset of variables to select for every observation vector received from the given asset-related data source in advance of receiving the given observation vector (e.g. during a "model definition" phase for the given asset-related data source), and then after receiving the given observation vector, asset data platform 102 may select the predefined subset of variables from the given observation vector. In this respect, the predefined subset of variables may exclude at least one variable that is known to obscure the ability to detect anomalies in observation vectors received from the given asset-related data source. For example, if the observation vectors output by the given asset-related data source are known to include one or more "output" variables for a subsystem that are driven by an "input" variable for the subsystem, asset data platform 102 may predefine a subset of variables to select for every observation vector received from the given asset-related data source that excludes the one or more "output" variables. Many other examples are possible as well.

The subset of variables selected from the given observation vector may then define the particular observed inferential space that is used for the given observation vector. In this respect, it will be appreciated that the observed full space may correspond to a plurality of different observed inferential spaces depending on which dimension(s) of the observed full space are removed. To illustrate this, consider a simplified example where the given observation vector includes a set of three variables, denoted as $O_1, O_2, O_3$, which define an observed full space having three dimensions. In such an example, there are several different subsets of variables that could be selected from the given observation vector depending on the inferential modeling approach being used and/or the contents of the given observation vector. For instance, asset data platform 102 could select (1) a first subset of variables including only $(O_1, O_2)$ from the given observation vector, which would define a first observed inferential space having two dimensions, (2) a second subset of variables including only $(O_1, O_3)$ from the given observation vector, which would define a second observed inferential space having two dimensions, or (3) a third subset of variables including only $(O_2, O_3)$ from the given observation vector, which would define a third observed inferential space having two dimensions. Many other examples are possible as well.

At block 610, asset data platform 102 may represent the set of training data vectors in the observed inferential space and then use a component analysis technique to transform the training data vectors from the observed inferential space to a new coordinate space, which may be referred to herein as a "transformed inferential space." In practice, this transformed inferential space may be thought of as a transformed version of the observed inferential space that is defined by the selected subset of variables. This function may take various forms.

According to one implementation, asset data platform 102 may first represent the set of training data vectors in the observed inferential space by reducing each training data vector to the selected subset of variables that define an observed inferential space. In other words, asset data platform 102 may identify the at least one variable that is excluded from the subset of variables and then remove the identified at least one variable from each training data vector in the set, thereby producing a representation of each training data vector in the observed inferential space. As part of this function, asset data platform 102 may also store the representation of each training data vector in the observed inferential space, along with an associative mapping for each training data vector that correlates its representation in the observed inferential space in the observed full space (and any other related coordinate spaces that may exist).

After representing the set of training data vectors in the observed inferential space, asset data platform 102 may then apply a component analysis technique to the representations of the training data vectors in the observed inferential space, which produces new representations of the training data vectors that define the new transformed inferential space. In accordance with the present disclosure, this new transformed inferential space may have a number of dimensions that is equal to or less than the number of dimensions in the corresponding observed inferential space. For instance, if the observed inferential space has n−1 dimensions, then the transformed inferential space either may have n−1 dimensions, or may have less than n−1 dimensions (e.g., one or more of the dimensions in the inferential transformed space may be ignored as representing random noise).

In a preferred example, asset data platform 102 may apply a variant of Principal Component Analysis (PCA) to the representations of the training data vectors in the observed inferential space, such as kernel PCA, robust PCA, or sparse PCA. In this example, the new transformed inferential space may be a PCA space comprised of a set of orthogonal dimensions, which are defined by a new set of uncorrelated variables referred to as principal components (PCs) that "explain" the variance and covariance in the subset of variables that define the observed inferential space.

However, asset data platform 102 may transform the set of training data vectors from the observed inferential space to a new transformed inferential space using other component analysis techniques as well, examples of which may include independent component analysis (ICA) and variants and/or partial least squares and its variants (e.g., partial least squares discriminant analysis, partial least squares path modeling, and orthogonal projections to latent structures).

As will be appreciated from the foregoing, the transformed inferential space that results from the transformation of the set of training data vectors may vary depending on which particular observed inferential space is selected by asset data platform 102. To illustrate this, consider the simplified example discussed above where the given observation vector includes a set of three variables, denoted as $O_1$, $O_2$, $O_3$, which define an observed full space having three dimensions. In such an example, the first observed inferential space defined by $(O_1, O_2)$ corresponds to a first transformed inferential space, the second observed inferential space defined by $(O_1, O_3)$ corresponds to a second transformed inferential space, and the third observed inferential space defined by $(O_2, O_3)$ corresponds to a third transformed inferential space. Many other examples are possible as well.

Depending on the inferential modeling approach being used, asset data platform 102 may perform this function at different times. For instance, if a "vector-by-vector" inferential modeling approach is being used, asset data platform 102 may carry out the function of representing the set of training data vectors in the observed inferential space and transforming the training data vectors from the observed inferential space to the transformed inferential space after determining that the given observation vector includes an invalid value, which dictates the particular observed inferential space to use for the given observation vector. In other words, once asset data platform 102 determines that a given observation vector has at least one variable with an invalid value, which dictates the particular observed inferential space to use for the given observation vector, asset data platform 102 may represent the set of training data vectors in that observed inferential space and then transform the training data vectors to the particular transformed inferential space corresponding to that particular observed inferential space. As part of this process, asset data platform 102 may also store the representations of the training data vectors in the transformed inferential space that corresponds to the observed inferential space, along with an associative mapping for each training data vector that correlates its representation in each of the different coordinate spaces.

However, it is also possible that asset data platform 102 could preemptively carry out the function of representing the set of training data vectors in the observed inferential space and transforming the training data vectors from the observed inferential space to the transformed inferential space before determining that the given observation vector has an invalid value. For example, after determining the observed full space and obtaining the set of training data vectors for the given asset-related data source, asset data platform 102 could engage in a preliminary "model definition" phase during which asset data platform 102 cycles through different observed inferential spaces that may be possible for the given asset-related data source (e.g., different subsets of the variables included in observation vectors received from the given asset-related data source) and transforms the set of training data vectors to a respective transformed inferential space corresponding to each such observed inferential space. As part of this process, asset data platform 102 may also store the representations of the training data vectors in each of these different observed and transformed inferential spaces, along with an associative mapping for each training data vector that correlates its representation in each of the different coordinate spaces. When asset data platform 102 later receives the given observation vector and determines that it has an invalid value, which dictates the particular observed inferential space to use for the given observation vector, asset data platform 102 may then access the previously-stored representations of the training data vectors in the particular transformed inferential space that corresponds to the particular observed inferential space.

On the other hand, if the "continuous" inferential modeling approach is being used, asset data platform 102 may carry out the function of representing the set of training data vectors in the observed inferential space and transforming the training data vectors from the observed inferential space to the transformed inferential space during a preliminary "model definition" phase that takes place at or around the time that asset data platform 102 predefines the subset of variables to select for every observation vector received from the given asset-related data source. In other words, once asset data platform 102 predefines the subset of variables to select for every observation vector received from the given asset-related data source, which dictates the particular observed inferential space to use for every observation vector received from the given asset-related data source, asset data platform 102 may then represent the set of training data vectors in the observed inferential space and transform the training data vectors to the particular transformed inferential space corresponding to that particular observed inferential space. As part of this process, asset data platform 102 may also store the representations of the training data vectors in the observed and transformed inferential spaces, along with an associative mapping for each training data vector that correlates its representation in each of the different coordinate spaces. When asset data platform 102 later begins receiving observation vectors from the given asset-related data source, the asset data platform may then access the previously-stored representations of the training data vectors in the transformed inferential space corresponding to the observed inferential space that has been predefined for the given asset-related data source.

The asset data platform could carry out the function of representing the set of training data vectors in the observed inferential space and transforming the training data vectors from the observed inferential space to the transformed inferential space at other times and/or in other manners as well.

At block 612, asset data platform 102 may then transform the given observation vector from the observed inferential space to the transformed inferential space that was created based on the set of training data. In practice, asset data platform 102 may perform this transformation in a manner that is similar to that described above for transforming the set of training data to the transformed inferential space. For instance, asset data platform 102 may take the representation of the given observation vector in the observed inferential space (e.g., the version of the given observation vector that only includes the selected subset of variables) and then apply the same component analysis technique that was used to transform the set of training data vectors to the transformed inferential space, which produces a representation of the given observation vector in the transformed inferential space. In line with the discussion above, this component analysis technique may be a variant of PCA, a variant of ICA, or a variant of partial least squares, among other examples.

As part of the process of transforming the given observation vector from the observed inferential space to the transformed inferential space, asset data platform 102 may standardize the representation of the given observation vector in the transformed inferential space. Generally, the process of standardization is used to describe the mathematical process by which the mean of a data set is subtracted from each value of the set to center the data, and the difference is divided by the standard deviation of the data to rescale the data. This type of standardization is known as z-score standardization. Other statistical properties can also be used to standardize the transformed inferential version of the given observation vector, such as subtracting the median or mode of each dimension of the transformed inferential space to center the data, or dividing by the range or $95^{th}$ percentile of each dimension of the transformed inferential space to rescale the data. As a consequence of such standardization, the variable values for the transformed inferential version of the given observation vector may be updated such that they are centered around the origin of the transformed inferential space. Asset data platform 102 may standardize the representation of the given observation vector in the transformed inferential space in other manners as well.

As part of the process of transforming the given observation vector from the observed inferential space to the transformed inferential space, asset data platform 102 may also modify one or more values of the representation of the given observation vector in the transformed inferential space by performing a comparison in the transformed inferential space between the representation of the given observation vector and a set of threshold values for the variables that define the transformed inferential space. This set of threshold values may take various forms and be defined in various manners.

In one implementation, this set of threshold values may be defined based on the set of training data and may comprise a respective threshold value for each selected variable in the transformed inferential space (e.g., each PC), where each variable's threshold value represents a maximum expected value of the variable during normal asset operation. However, the set of threshold values could take other forms as well. For instance, in some implementations, the set of threshold values defined based on the set of training data may contain threshold values that correspond to less than all of the selected variables present in the transformed coordinate space. In other implementations, the threshold for given variable(s) in the transformed inferential space may be associated with a measure of the training data vectors other than the maximum value. For example, the threshold may be associated with the 95th or 99th percentile of the distribution of the training data vectors in the transformed inferential space. As another example, the threshold value may be set to some constant multiplied by the maximum value, such as 2 times or 1.5 times the maximum value of the training data vectors in the transformed inferential space.

In practice, the set of thresholds may be viewed as multi-dimensional enclosed shape (e.g., a circle, ellipsoid, etc.) in the transformed inferential space that effectively defines a boundary centered around the transformed inferential space's origin.

Asset data platform 102 may perform the comparison in the transformed inferential space between the representation of the given observation vector and the set of threshold values in various manners. In an example, asset data platform 102 may compare the value for each respective variable (e.g., each PC) of the transformed inferential representation of the given observation vector to the defined threshold value for that respective variable, to determine whether or not the value for that variable exceeds the defined threshold value. However, asset data platform 102 may perform the comparison in other manners as well.

Further, based on the comparison, asset data platform 102 may modify one or more values of the transformed inferential representation of the given observation vector in various manners. For instance, if asset data platform 102 determines based on the comparison that the transformed inferential representation of the given observation vector comprises at least one variable value in the transformed inferential space (e.g., a PC value) that exceeds a defined threshold value for that variable, asset data platform 102 may modify the transformed inferential representation of the given observation vector that the at least one variable value no longer exceeds the defined threshold value. In other words, asset data platform 102 may be configured to "shrink" one or more values of the transformed inferential representation of the given observation vector so that the transformed inferential representation of the given observation vector falls closer to (and perhaps within) the multi-dimensional enclosed shape bounded by the set of threshold values.

In one implementation, asset data platform 102 may modify the transformed inferential representation of the given observation vector on a variable-by-variable basis (e.g., a PC-by-PC basis), by replacing any variable value that exceeds the defined threshold value with the defined threshold value for that variable. For example, if the transformed inferential representation of the given observation vector comprises two variable values that exceed defined threshold values in the transformed inferential space, asset data platform 102 may replace the value of each such variable with the defined threshold value for that variable, thereby resulting in a reduction in magnitude of those two variable values. This implementation may be referred to as "component shrinkage."

In another implementation, asset data platform 102 may modify the transformed inferential representation of the given observation vector by modifying a plurality of the vector's values in a coordinated manner. For example, if the transformed inferential representation of the given observation vector is determined to lay outside the multi-dimensional enclosed shape bounded by the set of threshold values in the transformed inferential space, asset data platform 102 may modify the values of the transformed inferential representation of the given observation vector in a manner such that the data point is effectively moved to the nearest point on the boundary. This implementation may be referred to as "vector shrinkage."

Asset data platform 102 may perform other functions as part of the process of transforming the given observation vector from the observed inferential space to the transformed inferential space as well.

At block 614, asset data platform 102 may perform a comparison in the transformed inferential space between the given observation vector and the set of training data vectors in order to identify a subset of the training data vectors that are closest to the given observation vector in the transformed inferential space. Asset data platform 102 may perform this function in various manners.

According to one implementation, asset data platform 102 may identify the subset of training data vectors that are closest to the given observation vector in the transformed inferential space based on their distances from the given observation vector. Asset data platform 102 may determine the subset of closest training data vectors based on a threshold distance, as one example. The threshold distance may be determined based on training data, or may be user-specified. Asset data platform 102 may order the training data vectors from closest to furthest based on their distances from the given observation vector in the transformed inferential space, and may select training data vectors that are below the threshold distance.

In another example, asset data platform may select a threshold number of vectors that are closest to the given observation vector in the transformed inferential space as the subset of closest training data vectors. Asset data platform 102 may determine which of the training data vectors are in the subset, e.g., by ordering the vectors based on their distance from the given observation vector in transformed inferential space, and selecting training data vectors to include in the subset starting with the closest training data vector, and moving to the furthest training data vector until the threshold number of vectors have been selected. Asset data platform 102 may identify the subset of training data vectors that are closest to the given observation vector in other manners as well.

As part of the process of identifying the subset of training data vectors that are closest to the given observation vector, the asset data platform may also assign a respective weighting value to each training data vector in the subset of closest vectors. For instance, asset data platform 102 may assign the weighting value to each training data vector in the subset based on how close the training data vector is to the given observation vector in the transformed inferential space. Asset data platform 102 may determine a respective weighting value for each training data vector in the subset in various manners. As one possible example, asset data platform 102 may take the inverse of a determined distance between the given observation vector and a given training data vector in the transformed inferential space and may then assign that inverse distance as the respective weighting value for the given training data vector. In another example, the respective weights may be based on an inverse of the square of the distance between the training data vector and the given observation vector in the transformed inferential space. Other examples are possible as well.

At block 616, after identifying the subset of training data vectors that are closest to the given observation vector in the transformed inferential space, asset data platform 102 may use the identified subset of training data vectors (which include valid values for all variables in the observed full space) to produce a predicted version of the given observation vector in the observed full space that includes valid values for the entire set of variables that define the observed full space. Asset data platform 102 may perform this function in various manners.

According to one implementation, asset data platform 102 may perform a regression analysis on the identified subset of training data vectors in a transformed version of the observed full space, which may be referred to herein the "transformed full space." To perform this analysis, asset data platform 102 may first transform the set of training data vectors from the observed full space to the transformed full space using a component analysis technique. For example, asset data platform 102 may apply a variant of PCA to the representations of the training data vectors in the observed full space, which produces new representations of the training data vectors in a PCA space that corresponds to the observed full space. Other examples are possible as well. In accordance with the present disclosure, this transformed full space may have a number of dimensions that is equal to or less than the number of dimensions in the corresponding observed full space. For instance, if the observed full space has n dimensions, then the transformed full space either may have n dimensions, or may have less than n dimensions (e.g., one or more of the dimensions in the transformed full space may be ignored as representing random noise).

As part of the process of transforming the set of training data vectors from the observed full space to the transformed full space, asset data platform 102 may also store the representations of the training data vectors in the transformed full space, along with an associative mapping for each training data vector in the set that correlates its representation in transformed full space to its representations in the other coordinate spaces (e.g., the observed full space, observed inferential space, and/or transformed inferential space). For example, each training data vector may have a unique identifier (e.g., a timestamp when the training data vector was received, an ordinal value that specifies the order in which the training data vector was added to the training data set, etc.) that is used to form the associative mapping with the training data vector's representation in each different coordinate space.

In practice, asset data platform 102 may perform this transformation at any point between the time that the set of training data for the given asset-related data source is identified and the time that the regression analysis is to be performed in the transformed full space. For example, asset data platform 102 may transform the set of training data vectors from the observed full space to the transformed full space during a preliminary "model definition" phase that takes place at or around the time that asset data platform 102 identifies the set of training data for the given asset-related data source. In another example, asset data platform 102 may transform the set of training data vectors from the observed full space to the transformed full space at or around the time that asset data platform 102 identifies the subset of training data vectors that are closest to the given observation vector in the transformed inferential space. Other examples are possible as well.

When asset data platform 102 identifies the subset of training data vectors that are closest to the given observation vector in the transformed inferential space, asset data platform 102 may then use the associative mapping for each training data vector in the identified subset to obtain the representation of each such training data vector in the transformed full space.

In turn, asset data platform 102 may perform a regression analysis on the representations of the identified subset of training data vectors in the transformed full space to produce a predicted version of the given observation vector in the transformed full space. Asset data platform 102 may perform this regression analysis using any nonparametric regression technique designed to calculate a prediction from a group of localized multivariate vectors. According to one possible example, such a regression analysis may involve calculating a weighted average of the identified subset of training data vectors in the transformed full space. In this respect, the asset data platform's calculation of the weighted average may be based on the weighting values discussed above and/or some other set of weighting values.

Lastly, asset data platform 102 may inversely transform (or project) the predicted version of the given observation vector from the transformed full space to the observed full space. This results in a predicted version of the given observation vector in the observed full space that includes valid values for the entire set of variables that define the observed full space.

According to another implementation, asset data platform 102 may perform a regression analysis on the identified subset of training data vectors in the observed full space. For instance, once the subset of training data vectors closest to the given observation vector in the transformed inferential space have been identified, asset data platform 102 may obtain the representation of each such training data vector in the observed full space (e.g., by using associative mappings that correlate the training data vectors' representations in the transformed inferential space with their representations in the observed full space). In turn, asset data platform 102 may perform a regression analysis on the representations of the identified subset of training data vectors in the observed full space to produce a predicted version of the given observation vector in the observed full space that includes valid values for the entire set of variables that define the observed full space. As above, asset data platform 102 may perform this regression analysis using any nonparametric regression technique designed to calculate a prediction from a group of localized multivariate vectors, including a weighted average calculation.

Asset data platform 102 may produce a predicted version of the given observation vector based on the subset of training data vectors using other techniques as well, including but not limited to techniques that involve the use of a localized regression algorithm in the observed/transformed and/or inferential/full spaces.

The example functions discussed above at blocks 614-616 will now be described in further detail in connection with FIGS. 7A-C. Beginning with FIG. 7A, a visualization of a transformed inferential space having two PCA dimensions (which corresponds to an observed inferential space having two dimensions) and a transformed full space having three PCA dimensions (which corresponds to an observed full space having three dimensions) is shown. In this visualization, the black "x" points in the lower half of the figure illustrate a set of 50 training vectors that have been transformed to the transformed inferential space, while the blue "dot" points in the upper half of the figure illustrate the same 50 training vectors that have been transformed to the transformed full space. The training data vectors in the two spaces are the same, except that the representation of the training data vectors in transformed inferential space only have values for two PCA dimensions. For instance, if the three-dimensional point $(I_1, I_2, I_3)$ represents the numeric values for the first, second, and third PCA dimension of the Ith training vector in the transformed full space, this point corresponds to the 2-dimensional point $(I_1, I_2)$ in the transformed inferential space.

Figure 7A:
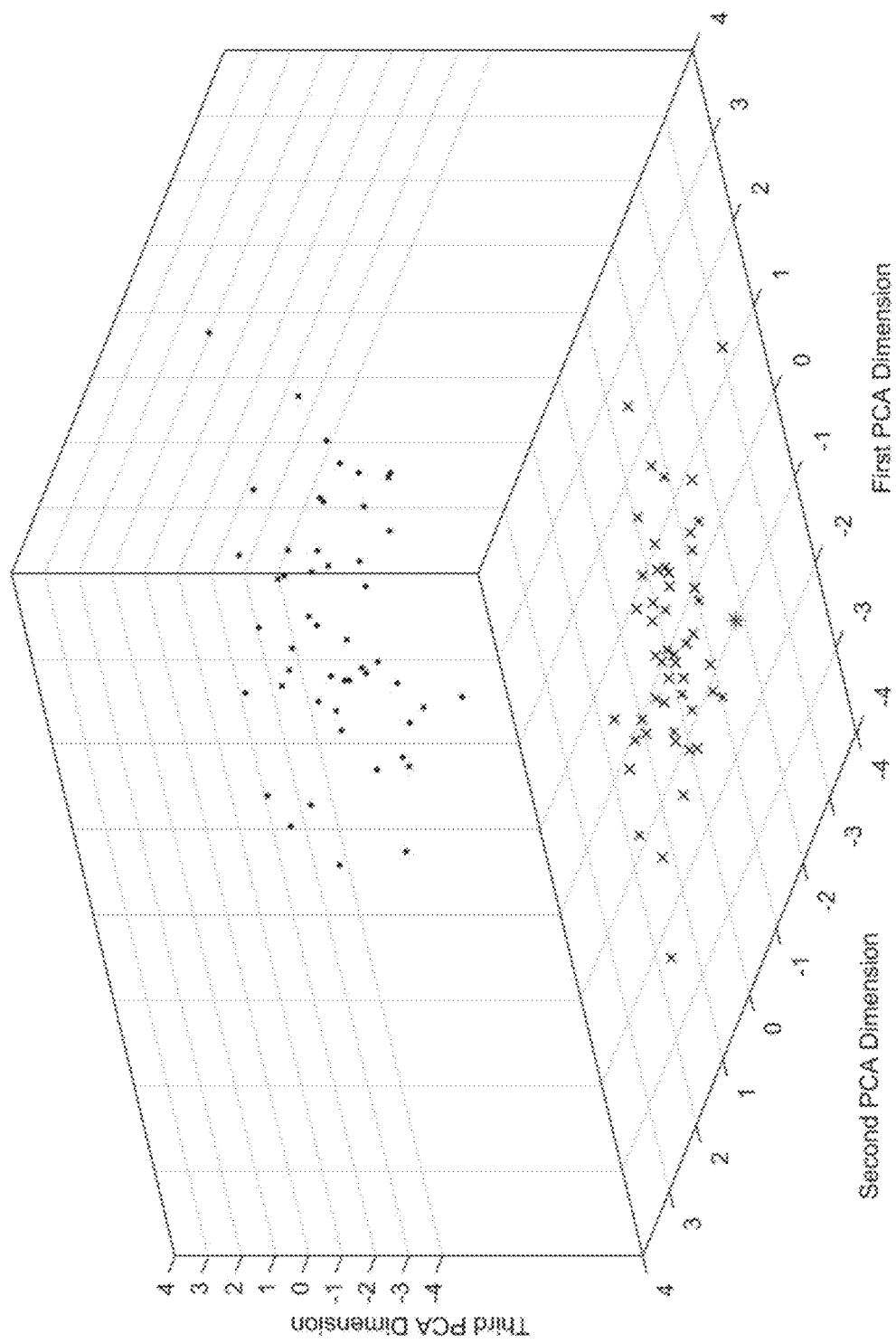
FIGS. 7A-C are visualizations of a set of training data vectors and a given observation vector in a transformed inferential space and a transformed full space.
Figure 7B:
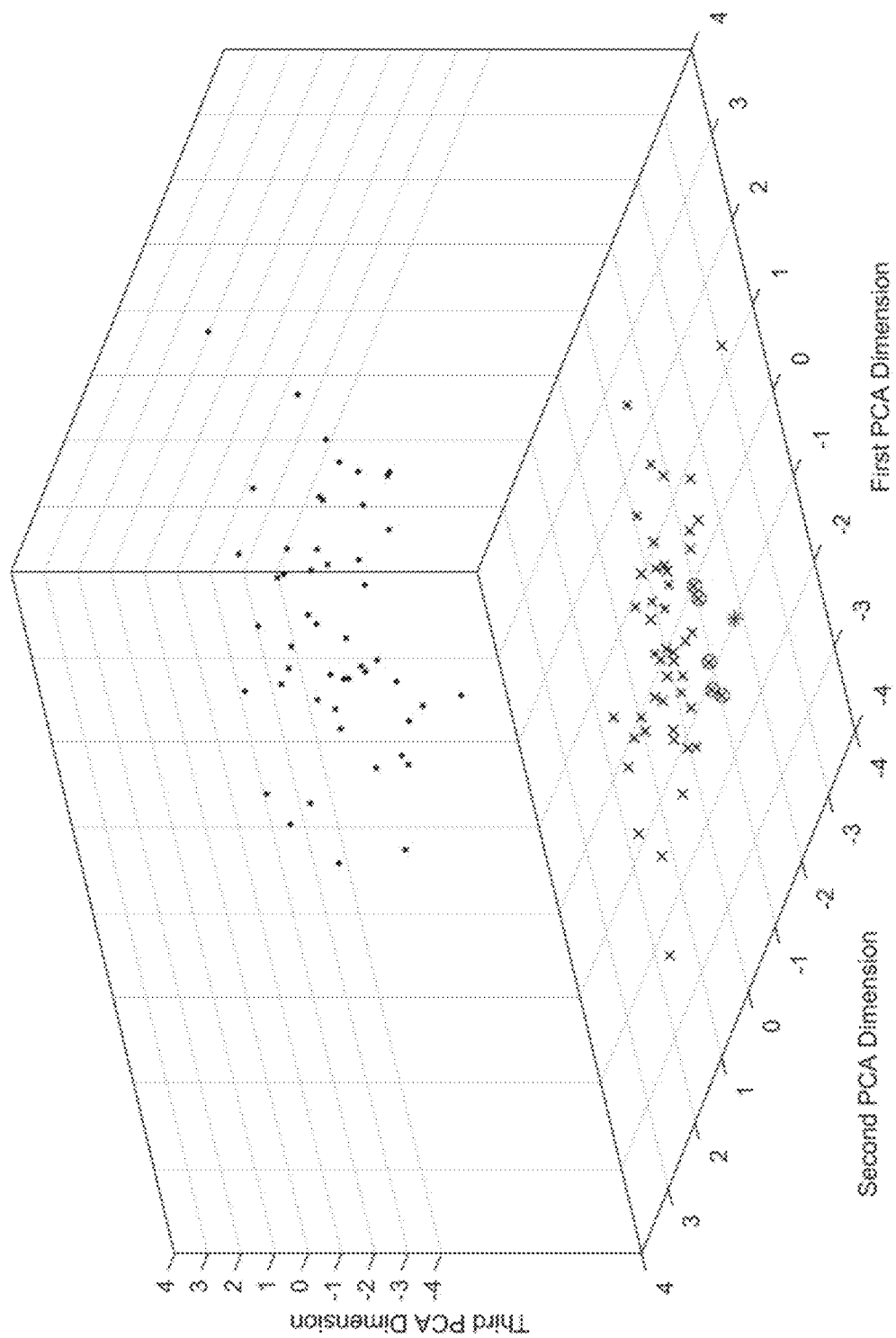

Additionally, a given observation vector that has been transformed from the observed inferential space to the transformed inferential space is illustrated in FIG. 7A as a red "asterisk" point. The representation of the given observation vector in the transformed inferential space may be denoted as $(O_1, O_2)$.

Once the training data points and the given observation vector have been represented in the transformed inferential space as shown in FIG. 7A, asset data platform 102 may perform a comparison between the given observation vector and the set of training data vectors in order to identify a subset of the training data vectors that are closest to the given observation vector in the transformed inferential space. The end result of this function is shown in FIG. 7B, which uses red circles to illustrate the subset of training data vectors that has been identified by asset data platform 102 in the transformed inferential space, which includes the 5 training data vectors nearest in distance to the given observation vector.

After identifying the 5 training data vectors nearest in distance to the given observation vector in the transformed inferential space, asset data platform 102 may determine the representations of these 5 training data vectors in the transformed full space based on associative mappings between the representations of the training data vectors in the different coordinate space. This is shown in FIG. 7C, which uses red lines to illustrate the associative mappings between the representations of the 5 nearest training data vectors in the transformed inferential space and the representations of the 5 nearest training data vectors in the transformed full space.

Figure 7C:
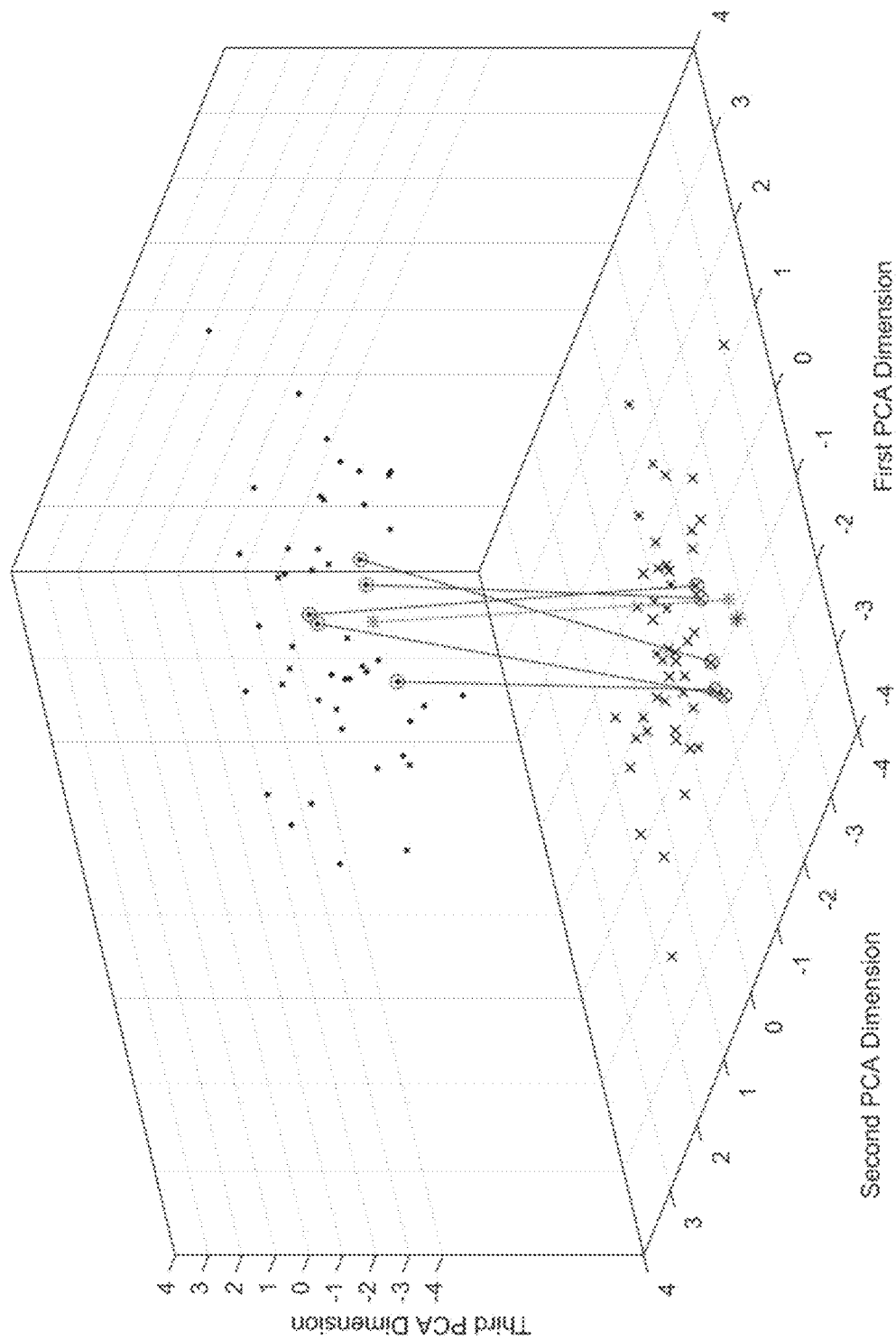

In turn, asset data platform 102 may perform a regression analysis on the representations of the 5 nearest training data vectors in the transformed full space to produce a predicted version of the given observation vector in the transformed full space, which is illustrated in FIG. 7C as a green asterisk in the transformed full space and may be denoted as $(P_1, P_2, P_3)$. In addition, FIG. 7C also uses a green line to illustrate an associative mapping between the predicted version of the given observation vector in the transformed full space and the predicted version of the given observation vector in the transformed inferential space.

As a final step, asset data platform 102 may then inversely transform the predicted version of the given observation vector from the transformed full space to the observed full space.

Returning back to FIG. 6, at block 618, asset data platform 102 may use the predicted version of the given observation vector while performing an analysis of whether an anomaly has occurred at the given asset-related data source. For example, asset data platform 102 may apply anomaly detection tests to analyze how the predicted versions of the given observation vectors compare to the original versions of observation data vectors (e.g., the received observation vectors) over a predefined period of time, in order to identify instances when one or more variables in the observation data appear to be anomalous (e.g., instances when statistically-significant discrepancies exist in at least one variable value between the post-transformation and pre-transformation observation data).

Furthermore, asset data platform 102 may utilize diagnostic and prognostic methods that analyze the original version of the observation data, the predicted version of the observation data, and anomaly detection test results to determine whether the anomalous behavior is indicative of equipment failure. Such diagnostic and prognostic methods include, but are not limited to, time series extrapolation, expert rules, and machine learning techniques.

To the extent asset data platform 102 identifies an anomaly at the asset, asset data platform 102 may perform various functions based on this identification. As one example, asset data platform 102 may generate notifications of the identified anomaly, which may be visually and/or audibly presented to a user, such as at representative client station 112. As another example, asset data platform 102 may be configured to discard asset data in which anomalies are identified, such that the potentially-unreliable data are not used by asset data platform 102 for other purposes (e.g., to present to a user, train or execute a model, etc.). Asset data platform 102 may perform other functions based on its identification of anomalies as well.

While the techniques disclosed herein have been discussed in the context of an asset data platform detecting anomalies in asset-related data, it should also be understood that the disclosed concepts may be used to detect anomalies in various other contexts as well.

V. CONCLUSION

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
a network interface;
at least one processor;
a non-transitory computer-readable medium; and
program instructions stored on the non-transitory computer-readable medium that are executable by the at least one processor to cause the computing system to:
obtain a set of training data vectors for a given asset-related data source, wherein the given asset-related data source outputs observation vectors related to asset operation, wherein the observation vectors output by the given asset-related data source comprise a given set of variables that defines an observed full space, and wherein each training data vector in the set of training data vectors is reflective of normal asset operation and includes a valid value for each variable in the observed full space;
represent the set of training data vectors in an observed inferential space that is defined by a given subset of the given set of variables and apply a component analysis technique to the set of training data vectors as represented in the observed inferential space in order to define a transformed inferential space that corresponds to the observed inferential space;
receive a given observation vector from the given asset-related data source, wherein the given observation vector includes at least one variable that is included in the observed full space but excluded from the observed inferential space due to the at least one variable either (i) having an invalid value or (ii) having a known interrelationship with one or more other variables included in the given observation vector;
represent the given observation vector received from the given asset-related data source in the observed inferential space and then transform the given observation vector from the observed inferential space to the transformed inferential space that was defined by applying the component analysis technique to the set of training vectors;
perform a comparison between the given observation vector as represented in the transformed inferential space and the set of training data vectors as represented in the transformed inferential space;
based on the comparison, identify a subset of training data vectors that are closest to the given observation vector in the transformed inferential space;
produce a predicted version of the given observation vector in the observed full space that has a valid value for each variable in the observed full space by:
obtaining respective representations of the identified subset of training data vectors in a transformed full space corresponding to the observed full space that is defined by applying the component analysis technique to the set of training data vectors as represented in the observed full space;
using a machine learning process to perform a non-parametric regression analysis on the respective representations of identified subset of training data vectors in the transformed full space that produces a predicted version of the given observation vector in the transformed full space; and
inversely transforming the predicted version of the given observation vector from the transformed full space to the observed full space, wherein the predicted version of the given observation vector includes a predicted value for each variable in the observed full space; and
use the predicted version of the given observation vector in the observed full space to determine whether an anomaly has occurred at the given asset.

2. The computing system of claim 1, wherein the program instructions that are executable to cause the computing system to represent the given observation vector in the observed inferential space and then transform the given observation vector from the observed inferential space to the transformed inferential space comprise program instructions that are executable to cause the computing system to:
represent the given observation vector in the observed inferential space and then transform the given observation vector from the observed inferential space to the transformed inferential space in response to determining that the given observation vector has the at least one variable with the invalid value.

3. The computing system of claim 2, wherein the at least one variable that is included in the observed full space but excluded from the observed inferential space comprises the at least one variable with the invalid value.

4. The computing system of claim 3, wherein the program instructions that are executable to cause the computing system to represent the set of training data vectors in the observed inferential space and then apply the component analysis technique to the set of training data vectors as represented in the observed inferential space in order to define the transformed inferential space comprise program instructions that are executable to cause the computing system to:

represent the set of training data vectors in the observed inferential space and then apply the component analysis technique to the set of training data vectors as represented in the observed inferential space in order to define the transformed inferential space in response to determining that the given observation vector has the at least one variable with the invalid value.

5. The computing system of claim 1, wherein the program instructions that are executable to cause the computing system to represent the given observation vector in the observed inferential space and then transform the given observation vector from the observed inferential space to the transformed inferential space comprise program instructions that are executable to cause the computing system to:
represent the given observation vector in the observed inferential space and then transform the given observation vector from the observed inferential space to the transformed inferential space in accordance with a predefined policy to represent every observation vector received from the given asset-related data source in the observed inferential space in order to exclude at least one variable having a known interrelationship with one or more other variables included in every observation vector received from the given asset-related data source.

6. The computing system of claim 5, further comprising program instructions stored on the non-transitory computer-readable medium that are executable by the at least one processor to cause the computing system to preselect the given subset of the given set of variables that defines the observed inferential space before receiving the given observation vector.

7. The computing system of claim 6, wherein the program instructions that are executable to cause the computing system to represent the set of training data vectors in the observed inferential space and then apply the component analysis technique to the set of training data vectors as represented in the observed inferential space in order to define the transformed inferential space comprise program instructions that are executable to cause the computing system to represent the set of training data vectors in the observed inferential space and then apply the component analysis technique to the set of training data vectors as represented in the observed inferential space in order to define the transformed inferential space before receiving the given observation vector, and wherein the computing system further comprises program instructions stored on the non-transitory computer-readable medium that are executable by the at least one processor to cause the computing system to:
after defining the transformed inferential space, store a representation of each training data vector in the transformed inferential space.

8. The computing system of claim 1, wherein:
the component analysis technique comprises a Principal Component Analysis (PCA) technique.

9. The computing system of claim 1, wherein the transformed inferential space comprises a number of dimensions that is equal to or less than a number of dimensions in the observed inferential space.

10. The computing system of claim 1, wherein the program instructions that are executable to cause the computing system to identify the subset of training data vectors that are closest to the given observation vector in the transformed inferential space comprise program instructions that are executable to cause the computing system to:

in the transformed inferential space, determine a distance between the given observation vector and each training data vector in the set of training data vectors; and
identify the subset of training data vectors that are closest to the given observation vector based on the determined distances.

11. A computing system comprising:
a network interface;
at least one processor; and
a non-transitory computer-readable medium having program instructions stored thereon that are executable to cause the computing system to:
obtain a set of training data vectors for a given asset-related data source, wherein the given asset-related data source outputs observation vectors related to asset operation, wherein the observation vectors output by the given asset-related data source comprise a given set of variables that defines an observed full space, and wherein each training data vector in the set of training data vectors is reflective of normal asset operation and includes a valid value for each variable in the observed full space;
represent the set of training data vectors in an observed inferential space that is defined by a given subset of the given set of variables and then apply a component analysis technique to the set of training data vectors as represented in the observed inferential space in order to define a transformed inferential space that corresponds to the observed inferential space;
receive a given observation vector from the given asset-related data source, wherein the given observation vector includes at least one variable that is included in the observed full space but excluded from the observed inferential space due to the at least one variable either (i) having an invalid value or (ii) having a known interrelationship with one or more other variables included in the given observation vector;
represent the given observation vector received from the given asset-related data source in the observed inferential space and then transform the given observation vector from the observed inferential space to the transformed inferential space that was defined by applying the component analysis technique to the set of training vectors;
perform a comparison between the given observation vector as represented in the transformed inferential space and the set of training data vectors as represented in the transformed inferential space;
based on the comparison, identify a subset of training data vectors that are closest to the given observation vector in the transformed inferential space;
produce a predicted version of the given observation vector in the observed full space that has a valid value for each variable in the observed full space by:
obtaining respective representations of the identified subset of training data vectors in the observed full space; and
using a machine learning process to perform a non-parametric regression analysis on the respective representations of the identified subset of training data vectors in the observed full space that produces the predicted version of the given observation vector in the observed full space, wherein the predicted version of the given observation vector includes a predicted value for each variable in the observed full space; and
use the predicted version of the given observation vector in the observed full space to determine whether an anomaly has occurred at the given asset.

12. The computing system of claim 11, wherein the program instructions that are executable to cause the computing system to represent the given observation vector in the observed inferential space and then transform the given observation vector from the observed inferential space to the transformed inferential space comprise program instructions that are executable to cause the computing system to:
represent the given observation vector in the observed inferential space and then transform the given observation vector from the observed inferential space to the transformed inferential space in response to determining that the given observation vector has the at least one variable with the invalid value.

13. The computing system of claim 12, wherein the at least one variable that is included in the observed full space but excluded from the observed inferential space comprises the at least one variable with the invalid value.

14. The computing system of claim 11, wherein the program instructions that are executable to cause the computing system to represent the given observation vector in the observed inferential space and then transform the given observation vector from the observed inferential space to the transformed inferential space comprise program instructions that are executable to cause the computing system to:
represent the given observation vector in the observed inferential space and then transform the given observation vector from the observed inferential space to the transformed inferential space in accordance with a predefined policy to represent every observation vector received from the given asset-related data source in the observed inferential space in order to exclude at least one variable having a known interrelationship with one or more other variables included in every observation vector received from the given asset-related data source.

15. A computer-implemented method comprising:
obtaining a set of training data vectors for a given asset-related data source, wherein the given asset-related data source outputs observation vectors related to asset operation, wherein the observation vectors output by the given asset-related data source comprise a given set of variables that defines an observed full space, and wherein each training data vector in the set of training data vectors is reflective of normal asset operation and includes a valid value for each variable in the observed full space;
representing the set of training data vectors in an observed inferential space that is defined by a given subset of the given set of variables and then applying a component analysis technique to the set of training data vectors as represented in the observed inferential space in order to define a transformed inferential space that corresponds to the observed inferential space;
receiving a given observation vector from the given asset-related data source, wherein the given observation vector includes at least one variable that is included in the observed full space but excluded from the observed inferential space due to the at least one variable either (i) having an invalid value or (ii) having a known interrelationship with one or more other variables included in the given observation vector;
representing the given observation vector received from the given asset-related data source in the observed inferential space and then transforming the given observation vector from the observed inferential space to the transformed inferential space that was defined by applying the component analysis technique to the set of training vectors;
performing a comparison between the given observation vector as represented in the transformed inferential space and the set of training data vectors as represented in the transformed inferential space;
based on the comparison, identifying a subset of training data vectors that are closest to the given observation vector in the transformed inferential space;
producing a predicted version of the given observation vector in the observed full space that has a valid value for each variable in the observed full space by:
obtaining respective representations of the identified subset of training data vectors in a transformed full space corresponding to the observed full space that is defined by applying the component analysis technique to the set of training data vectors as represented in the observed full space;
using a machine learning process to perform a non-parametric regression analysis on the respective representations of identified subset of training data vectors in the transformed full space that produces a predicted version of the given observation vector in the transformed full space; and
inversely transforming the predicted version of the given observation vector from the transformed full space to the observed full space, wherein the predicted version of the given observation vector includes a predicted value for each variable in the observed full space; and
using the predicted version of the given observation vector in the observed full space to determine whether an anomaly has occurred at the given asset.

16. The computer-implemented method of claim 15, wherein representing the given observation vector in the observed inferential space and then transforming the given observation vector from the observed inferential space to the transformed inferential space comprises:
representing the given observation vector in the observed inferential space and then transforming the given observation vector from the observed inferential space to the transformed inferential space in response to determining that the given observation vector has the at least one variable with the invalid value.

17. The computer-implemented method of claim 16, wherein the at least one variable that is included in the observed full space but excluded from the observed inferential space comprises the at least one variable with the invalid value.

18. The computer-implemented method of claim 15, wherein representing the given observation vector in the observed inferential space and then transforming the given observation vector from the observed inferential space to the transformed inferential space comprises:
representing the given observation vector in the observed inferential space and then transforming the given observation vector from the observed inferential space to the transformed inferential space in accordance with a predefined policy to represent every observation vector received in the given asset-related data source from the observed inferential space in order to exclude at least one variable having a known interrelationship with one or more other variables included in every observation vector received from the given asset-related data source.

\* \* \* \* \*